(12) United States Patent
Ishikawa et al.

(10) Patent No.: US 9,166,461 B2
(45) Date of Patent: Oct. 20, 2015

(54) AUTOMOTIVE ALTERNATOR HAVING A HEAT DISSIPATING PLATE

(75) Inventors: Toshio Ishikawa, Hitachinaka (JP); Mitsuaki Izumi, Hitachinaka (JP); Kunihiro Ohsawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 352 days.

(21) Appl. No.: 13/470,738

(22) Filed: May 14, 2012

(65) Prior Publication Data

US 2012/0299449 A1 Nov. 29, 2012

(30) Foreign Application Priority Data

May 17, 2011 (JP) ................................. 2011-110008

(51) Int. Cl.
*H02K 9/22* (2006.01)
*H02K 11/04* (2006.01)
*H02K 5/20* (2006.01)

(52) U.S. Cl.
CPC ................ *H02K 11/046* (2013.01); *H02K 9/22* (2013.01); *H02K 5/20* (2013.01)

(58) Field of Classification Search
CPC ................. H02K 19/36; H02K 11/04–11/048; H02K 9/22
USPC ................................................. 310/64, 68 D
See application file for complete search history.

(56) References Cited

U.S. PATENT DOCUMENTS

| | | | | |
|---|---|---|---|---|
| 4,583,005 A * | 4/1986 | Bevans | ........................ | 307/115 |
| 5,659,212 A * | 8/1997 | DePetris | ..................... | 310/68 D |
| 5,828,564 A * | 10/1998 | Mori et al. | ..................... | 363/141 |
| 6,970,357 B2 * | 11/2005 | Hsieh | ............................ | 361/704 |
| 7,067,947 B2 | 6/2006 | Ihata et al. | | |
| 7,282,824 B2 * | 10/2007 | Fujioka | ....................... | 310/68 D |
| 7,855,480 B2 * | 12/2010 | Ito et al. | ...................... | 310/68 D |
| 7,876,006 B2 | 1/2011 | Kondo | | |
| 2004/0239195 A1 * | 12/2004 | Okamura et al. | ........... | 310/68 D |
| 2010/0117466 A1 * | 5/2010 | Gas et al. | ........................ | 310/62 |

FOREIGN PATENT DOCUMENTS

| | | |
|---|---|---|
| JP | 61-180556 A | 8/1986 |
| JP | 10-56760 A | 2/1998 |
| JP | 11-164538 A | 6/1999 |

(Continued)

OTHER PUBLICATIONS

Japanese Office Action with English translation thereof dated Jul. 9, 2013 {Eight (8) Pages}.

*Primary Examiner* — Thomas Truong
(74) *Attorney, Agent, or Firm* — Crowell & Moring LLP

(57) ABSTRACT

To provide a high-quality, high-output, and low-cost automotive alternator by suppressing heat generation through the reduction of current loss in a heat dissipating plate of a rectifier without expanding a space for placing the heat dissipating plate and reducing the cooling performance of the heat dissipating plate. An automotive alternator includes a rectifier, wherein the rectifier is configured such that a heat dissipating plate of positive pole to which the rectifier element of positive pole is mounted is disposed opposite to a heat dissipating plate of negative pole to which a plurality of rectifier elements of negative pole are mounted; wherein the heat dissipating plate of positive pole is made up of a first heat dissipating plate and a second heat dissipating plate, which are made of two different materials.

12 Claims, 20 Drawing Sheets

(56) References Cited

FOREIGN PATENT DOCUMENTS

| | | |
|---|---|---|
| JP | 2004-147486 A | 5/2004 |
| JP | 2008-61293 A | 3/2008 |
| JP | 2009-60711 A | 3/2009 |
| JP | 2011-193596 A | 9/2011 |

* cited by examiner

AUTOMOTIVE ALTERNATOR HAVING A HEAT DISSIPATING PLATE

BACKGROUND OF THE INVENTION

The present invention relates to an automotive alternator including a rectifier.

In recent years, as the demand for electric instruments grows in an automobile, there is a trend toward higher power output in automotive alternators. With such increase in power output in an automotive alternator, a problem arises in that as the output current increases, the heat generation of each part increases, leading to a reduction of the lifetime thereof due to temperature increase.

Particularly, a rectifier element, which rectifies an alternate current generated by the automotive alternator, is significantly affected by temperatures caused by heat generation and exhibits a sharp decline of lifetime when a heat resistant temperature is exceeded.

Further, in addition to the increase of heat generation due to an increase in output current, there is an increasing trend in temperature of the ambient environment where an automotive alternator is mounted, as the result of the space reduction in the engine room in recent years, and thus a temperature reduction by increasing the cooling performance of a rectifier element has become an important issue.

Accordingly, for the improvement of cooling efficiency of a rectifier, JPA-2009-60711 proposes to reduce the temperature of rectifier element by exploiting an axial flow in a limited space and devising the shape of heat dissipating fin to increase the cooling efficiency of heat dissipating plate.

Moreover, for the improvement of cooling efficiency of a rectifier, JP-A-11-164538 proposes to reduce a temperature of a rectifier element by allowing cooling air from the outside to efficiently flow into and pass through between a rectifier element of positive pole and a protection cover and, in the case of a rectifier element of negative pole, between a rear frame and a second heat dissipating plate, thereby improving the cooling effect of heat dissipating plates. Thus, cooling of the rectifier element of an automotive alternator is achieved by the optimization of the shape and the expansion of the heat dissipating area of heat dissipating fins, the optimization of the flow path of cooling air, and so on.

BRIEF SUMMARY OF THE INVENTION

However, the electricity demand on the automobile side has been on an ever increasing trend in recent years, and as the power generation of an automotive alternator significantly increases, it becomes unable to ensure a heat dissipating area of the heat dissipating plate by the cooling method of the rectifier of JP-A-2009-60711, the cooling capacity of the heat dissipating plate reaches a saturated state so that the temperature of the rectifier element exceeds its heat resistant temperature to bring about a sharp decline of lifetime.

Moreover, since a heat dissipating plate not only has an effect as a heat dissipating fin for cooling a rectifier element, but also serves as a path for supplying power generated at a stator to the automobile side, a large current will flow in the heat dissipating plate itself as the output power increases, and therefore the heat generation of the heat dissipating plate will significantly affect the temperature increase of rectifier element.

It is an object of the present invention to improve the cooling efficiency of a heat dissipating plate of a rectifier, and thereby provide a high-quality, high-power, and low-cost automotive alternator.

The above described object is achieved by an automotive alternator, wherein a rectifier is configured to include a first metal member electrically connected to a plurality of rectifier elements, and a second metal member which is formed integrally with the first plate member, and has a heat dissipating fin structure, and wherein the thermal conductivity of the first metal member is arranged to be larger than that of the second metal member.

Advantageous Effects Of Invention

According to the present invention, there is provided an automotive alternator including a rectifier in which the amount of heat generation due to the current flowing in a heat dissipating plate can be reduced, thereby improving the cooling performance of a rectifier element.

Other objects, features and advantages of the present invention will become clear from the following description of embodiments of the present invention relating to the appended drawings.

DETAILED DESCRIPTION OF THE INVENTION

Hereafter, each embodiment will be described by using the drawings.

First Embodiment

The configuration of an automotive alternator according to a first embodiment of the present invention will be described by using FIGS. 1 and 2.

Figure 1:
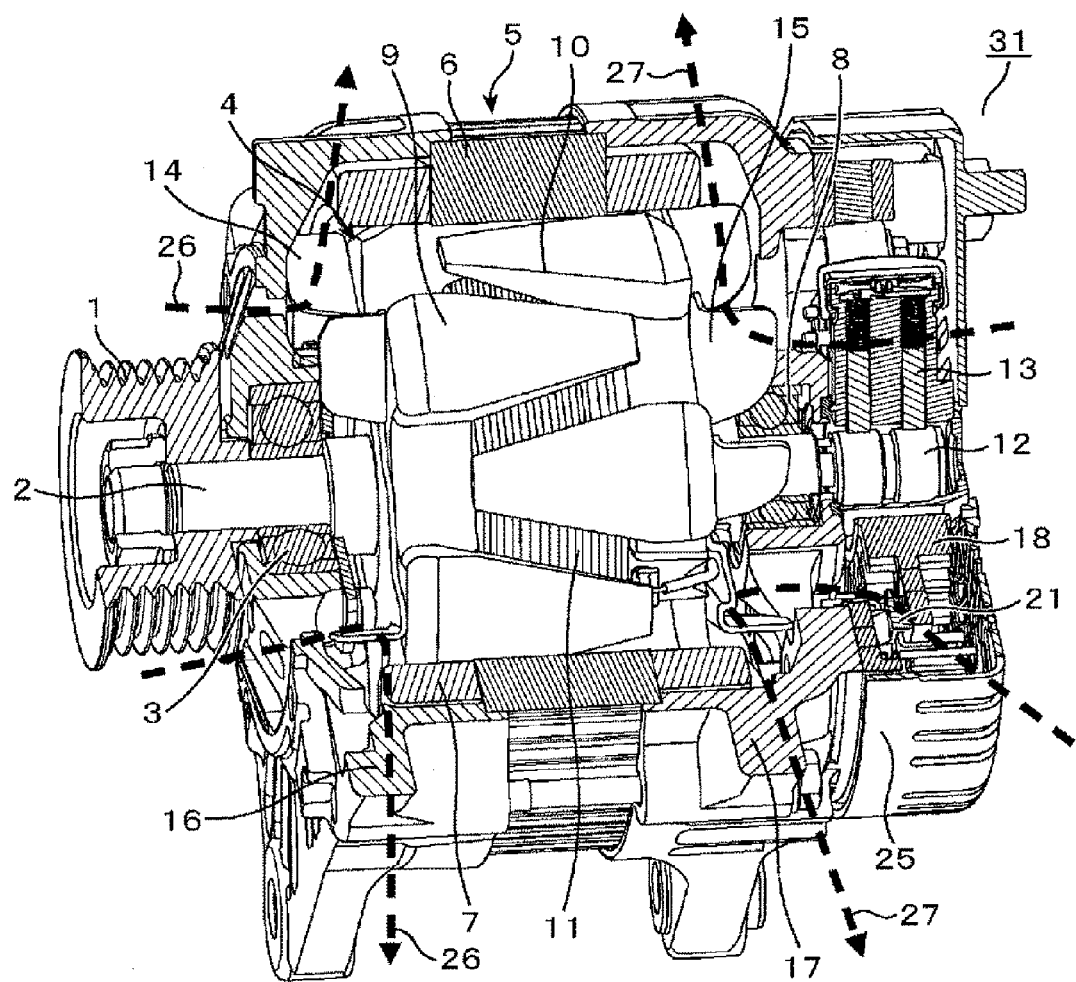
FIG. 1 is a sectional view to show the general configuration of an automotive alternator according to a first embodiment of the present invention.
Figure 2:
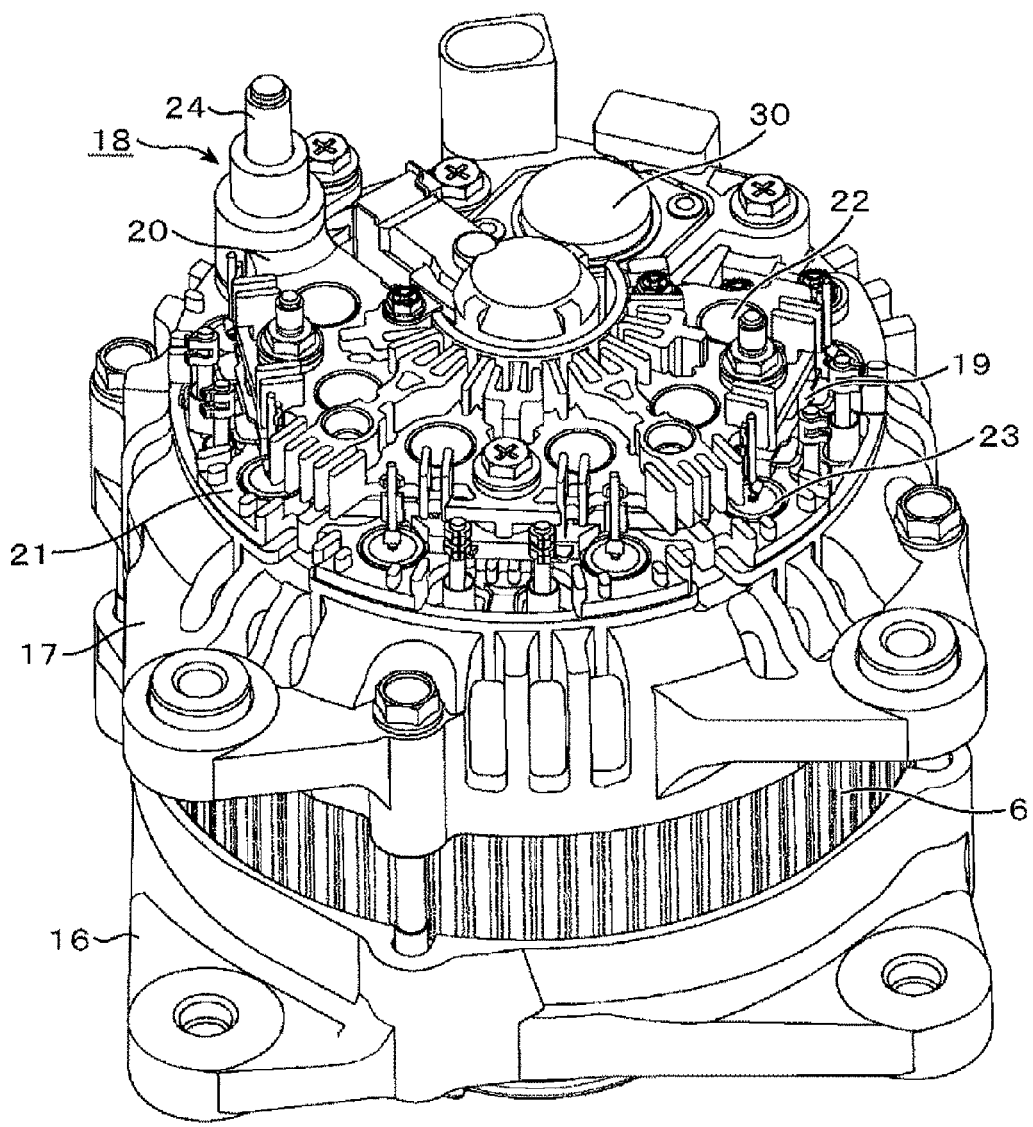
FIG. 2 is a rear-side perspective view of the automotive alternator according to the first embodiment of the present invention in a state where its protective cover is detached.

FIG. 1 is a sectional view to show the general configuration of an automotive alternator according to a first embodiment of the present invention; and FIG. 2 is a rear-side perspective view of the automotive alternator, in a state where its protective cover is detached.

An automotive alternator 31 includes a rotator 4 and a stator 5. The rotator 4 includes a field coil 11 at a center portion of a shaft 2, and a front-side claw pole 9 and a rear-side claw pole 10, which are formed of magnetic materials, are disposed so as to interpose the field coil 11 therebetween and cover it. The front-side claw pole 9 and the rear-side claw pole 10 are disposed such that the claw portions are opposed to each other, and one claw pole is engaged with the other claw pole.

The rotator 4 is oppositely disposed to the inner peripheral side of the stator 5 via a slight vacant space. The rotator 4 is rotatably supported by a shaft 2 which is inserted through inner rings of a front bearing 3 and a rear bearing 8.

The stator 5 is made up of a stator core 6 and a stator coil 7. The stator core 6 is configured such that a plurality of thin steel plates, each of which is formed into an annular shape, are stacked, and there are protruding teeth on an inner peripheral side with a slot being formed between each tooth. The stator coil 7 of each phase is mounted by being inserted into a respective slot spanning a plurality of teeth. The both ends of the stator 5 are held by a front frame 16 and a rear frame 17.

A pulley 1 is attached to one end of the shaft 2. A slip ring 12 is provided at the other end of the shaft 2 so as to be in contact with a brush 13 to supply power to the field coil 11. Moreover, a front fan 14 and a rear fan 15, each of which is a cooling fan having a plurality of vanes on the outer peripheral side thereof, are provided on both end surfaces of a front-side claw pole 9 and a rear-side claw pole 10 of the rotator 4, and are arranged to circulate air by a centrifugal force generated by rotation such that air is introduced from the outside and the air that has cooled the interior is discharged to the outside.

Cooling air 26 of the front side passes through the front fan 14 from a ventilator window of the front frame 16, cools a coil end of the stator coil 7, and is discharged from a ventilator window of the front frame 16. Cooling air 27 of the rear side enters from an opening portion of a protective cover 25, cools a rectifier 18 and an IC regulator 30, passes through the rear fan 15 from a ventilator window in the central portion of the rear frame 17, cools the coil end of the stator coil 7, and is discharged from a ventilation window of the rear frame 17.

The stator coil 7 is made up of a stator coil 7 having two sets of three-phase coils in the present embodiment, and a lead wire of each coil is connected to the rectifier 18. The rectifier 18 is made up of a rectifier element such as a diode, and constitutes a full-wave rectification circuit. In the case of a diode, for example, a cathode terminal is connected to a rectifier-element connecting terminal 19. Moreover, the terminal of the anode side is electrically connected to the automotive alternator main body. The protective cover 25 serves to protect the rectifier 18 and provide electric insulation therefor such that it will not come into direct contact with the positive side terminal.

Next, power generation operation will be described.

First, since rotation is transferred to the pulley 1 from a crankshaft via a belt as the engine is started, the rotator 4 is rotated via the shaft 2. Here, since supplying a direct current from the brush 13 to the field coil 11 provided in the stator 4 via a slip ring 12 will generate a magnetic flux that circles around the inner and outer circumferences of the field coil 11, an N pole or S pole is formed alternately in the circumferential direction at the front-side claw pole 9 and the rear-side claw pole 10 in the rotator 4. This magnetic flux by the field coil 11 circles around the stator coil 7 from the N-pole of the front-side claw pole 9 through the stator core 6, and reaches the S-pole of the rear-side claw pole 10 of the rotator 4 thereby forming a magnetic circuit that circles around the rotator 4 and the stator 5. Since the magnetic flux thus generated at the rotator interlinks with the stator coil 7, an alternating induced voltage is generated at each of the stator coils 7 of U1 phase, V1 phase, W1 phase, U1 phase, V1 phase, and W1 phase, and alternating induced voltages for 6 phases occur as a whole.

The alternating voltage thus generated is rectified in full wave by a rectifier 18, which is made up of a rectifier element such as a diode, to be transferred to a direct current. The rectified direct voltage is achieved by controlling the current to be supplied to field coil 11 by an IC regulator 30 so as to be a constant voltage.

Next, the configuration of a rectifier of an automotive alternator according to the present embodiment will be described by using FIGS. 2 to 6.

Figure 3:
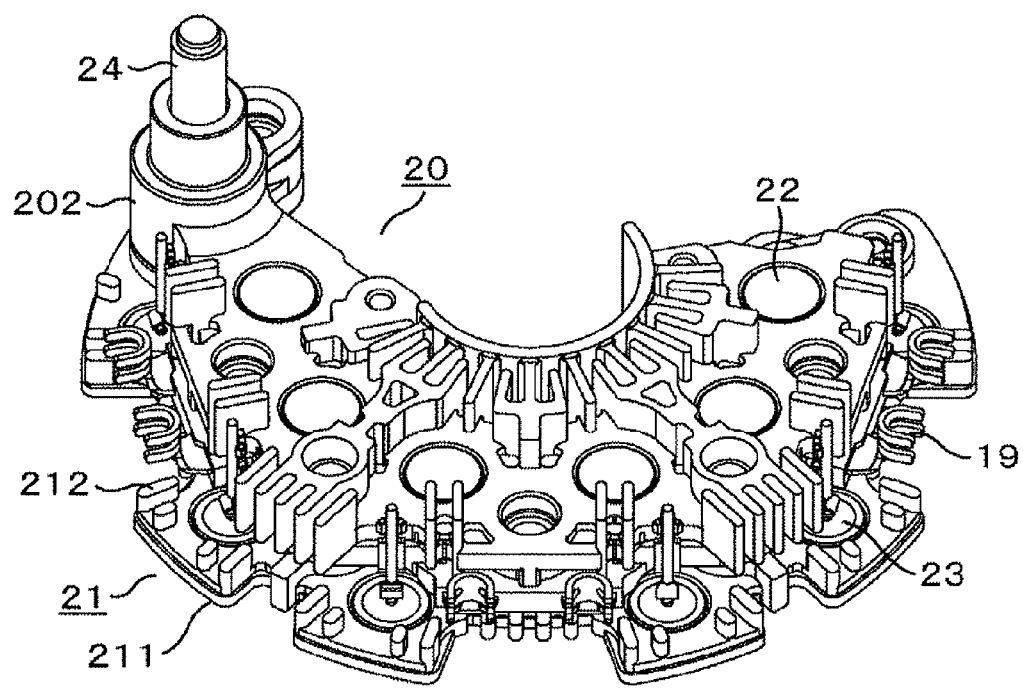
FIG. 3 is a perspective view of a rectifier according to the first embodiment of the present invention.
Figure 4:
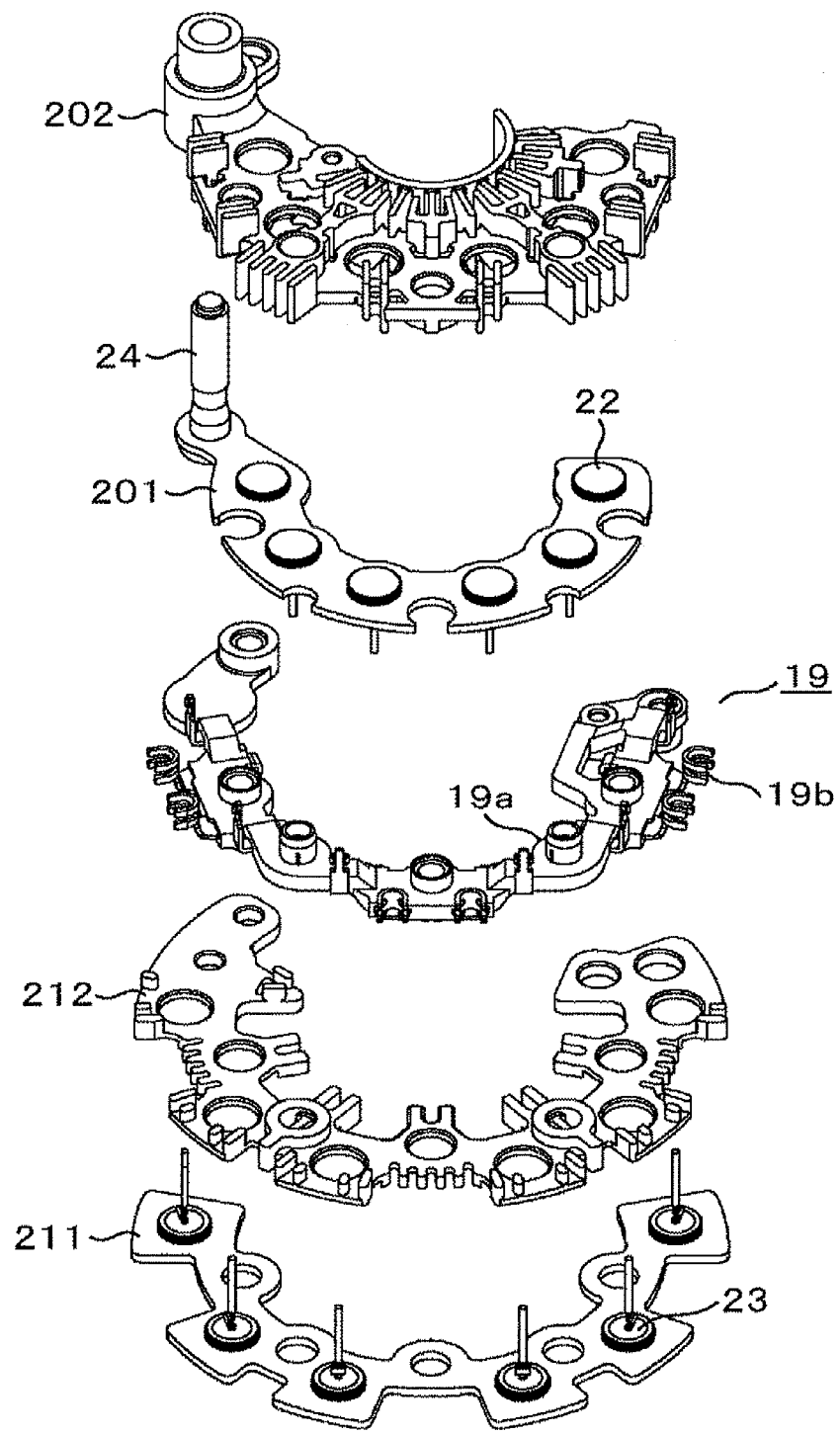
FIG. 4 is an exploded view of the rectifier according to the first embodiment of the present invention.
Figure 5:
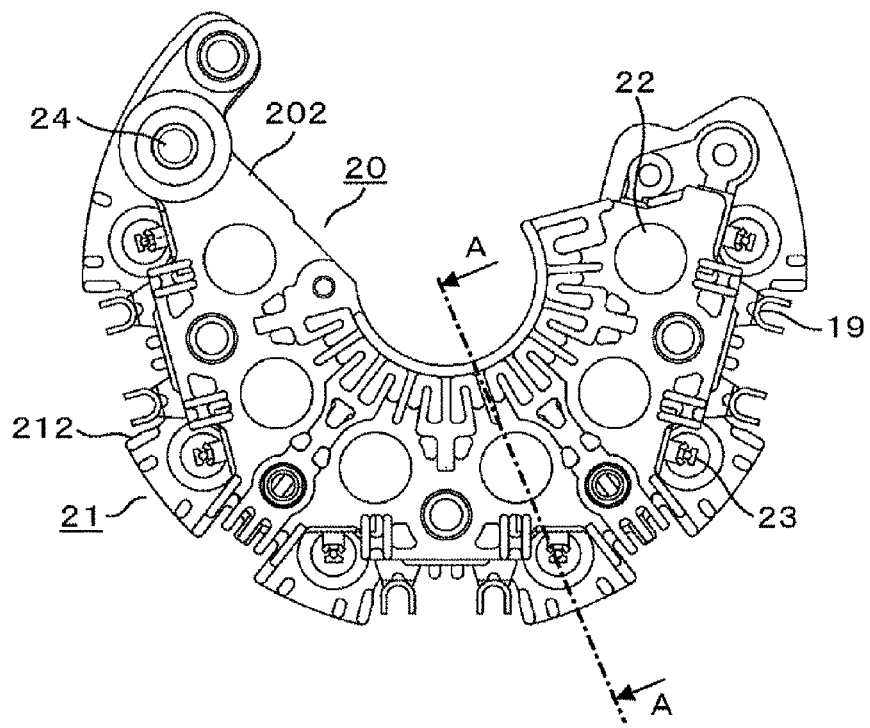
FIG. 5 is a rear side front view of the rectifier according to the first embodiment of the present invention.
Figure 6:
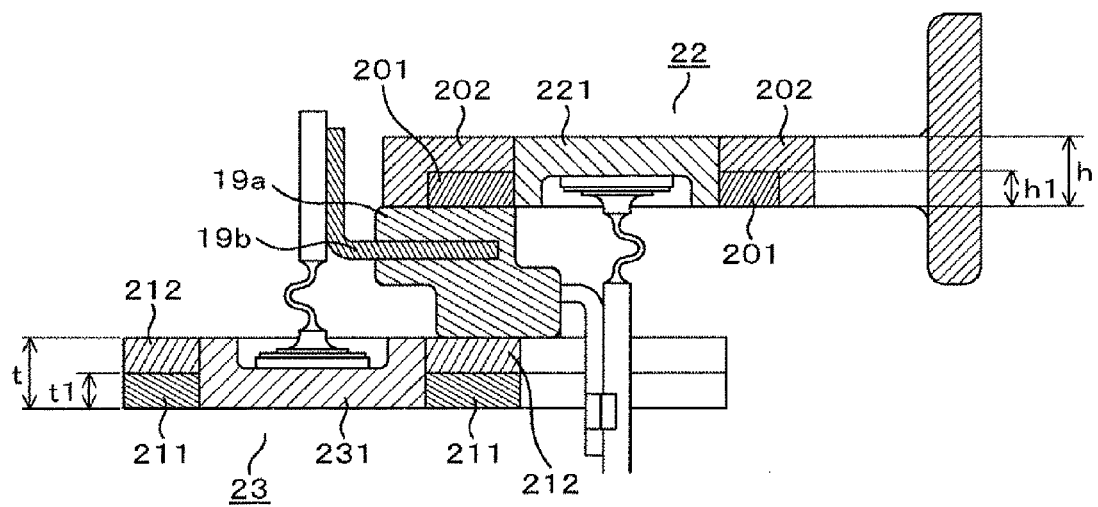
FIG. 6 is a view taken along an A-A section of FIG. 5.

FIG. 3 is a perspective view of a rectifier according to a first embodiment of the present invention. FIG. 4 is an exploded view of the rectifier according to the first embodiment of the present invention. FIG. 5 is a front view from the rear side of the rectifier according to the first embodiment of the present invention. FIG. 6 is a view taken along an A-A section of FIG. 5.

As shown in FIGS. 3 and 4, a heat dissipating plate 20 of positive pole and a heat dissipating plate 21 of negative pole are oppositely disposed to each other in the rectifier 18 to be mounted on the automotive alternator 31, six rectifier elements 22 of positive pole are mounted on the heat dissipating plate 20 of positive pole, and six rectifier elements 23 of negative pole are mounted on the heat dissipating plate 21 of negative pole.

A rectifier-element connecting plate (connecting terminal plate) 19 which connects each rectifier element and makes up a full-wave rectifier circuit is provided between the heat dissipating plate 20 of positive pole and the heat dissipating plate 21 of negative pole, and the concerned terminal plate has at the same time a function of keeping a constant electrical insulation distance between the heat dissipating plate 20 of positive pole and the heat dissipating plate 21 of negative pole.

The rectifier-element connecting plate 19 includes an insulation material portion 19a which is a resin molded part, and a terminal 19b which is made of iron or copper and is insert-molded thereinto to connect the aforementioned each rectifier element thereby making up a rectifier circuit. Moreover, connecting the stator coil 7 with the IC regulator 30 will make them function as an automotive alternator 31.

The rectifier 18 is mounted to the rear frame 17 as shown in FIG. 2. Moreover, the heat dissipating plate 21 of negative pole of the rectifier 18 is configured to be in direct contact with the rear frame 17 such that the heat generated at the rectifier element 23 of negative pole is transferred to the heat dissipating plate 21 of negative pole to cause the rear frame 17 to directly dissipate heat, thereby ensuring a heat dissipating area and improving the cooling performance. Moreover, the rectifier 18 is electrically connected to the rear frame 17, thereby being electrically connected to the earth of the automobile side through the rear frame 17.

The heat dissipating plate 20 of positive pole is made up of a dual structure in which the first heat dissipating plate 201 of positive pole and the second heat dissipating plate 202 of positive pole are made of different materials as shown in FIGS. 4, 5 and 6, and the first heat dissipating plate 201 of positive pole is shaped to electrically link the rectifier elements of positive pole with a B-terminal bolt 24, and is provided with a plurality of holes in a horseshoe-shaped plate so that each rectifier element 22 of positive pole and the B-terminal bolt 24 are press-fit thereinto, thereby being electrically connected.

Each rectifier element 22 of positive pole is linked to the B terminal bolt 24 by the first heat dissipating plate of positive pole to constitute wiring for an electric circuit which supplies power to the automobile side.

The plate thickness h1 of the first heat dissipating plate 201 of positive pole is preferably arranged to be in a range of 1/4 to 2/3 with respect to the thickness 'h' of a base 221 portion of the rectifier element 22 of positive pole, and the base 221 of the rectifier element 22 of positive pole is desirably press-fit into the first heat dissipating plate 201 of positive pole.

The material of the first heat dissipating plate 201 of positive pole preferably has a low electric resistance and a coefficient of linear expansion equivalent to that of the base 221 of the rectifier element. A material having a low electric resistance can reduce heat generation loss caused by a power generation current, making it possible to realize further improvements in efficiency and temperature reduction of the rectifier element 22 of positive pole. The first heat dissipating plate 201 of positive pole is preferably made of copper and is desirably fabricated as a sheet stamping part, which can be manufactured at low cost.

The second heat dissipating plate 202 of positive pole is disposed so as to cover the upper face of the first heat dissipating plate 201 of positive pole, and is provided with a large number of heat dissipating fins in the upper and lower faces thereof to improve heat dissipating performance. The second heat dissipating plate 202 of positive pole is preferably made of a material having a high thermal conductivity, and is desirably fabricated by a low-cost and high-productivity process, for example, aluminum die-casting to provide a large number of heat dissipating fins. By forming the second heat dissipating plate 202 of positive pole integral with the material of the first heat dissipating plate 201 of positive pole by aluminum die-casting, it is possible to make up a heat dissipating plate 20 of positive pole which is low in cost and excellent in productivity.

The heat dissipating plate 21 of negative pole is made up of a dual structure in which the first heat dissipating plate 211 of negative pole and the second heat dissipating plate 212 of negative pole are made of different materials as shown in FIGS. 4, 5 and 6, and the first heat dissipating plate 211 of negative pole is shaped so as to electrically link a plurality of the rectifier elements 23 of negative pole and is provided with a plurality of holes in a horseshoe-shaped plate so that each rectifier element 23 is press-fit thereinto, thereby being electrically connected.

Respective rectifier elements 23 of negative pole are linked by the first heat dissipating plate 211 of negative pole to constitute wiring for an electric circuit which supplies power to the automobile side.

Further, the first heat dissipating plate 211 of negative pole is disposed on the rear frame 17 side to be positioned in direct contact therewith to constitute wiring for an electric circuit which has a low electric loss and connects to the earth of the automobile side.

The thickness t1 of first heat dissipating plate 211 of negative pole is arranged to be in a range of 1/4 to 2/3 with respect to the thickness of the base 231 portion of the rectifier element 23 of negative pole, and the base 231 of the rectifier element 23 of negative pole is press-fit into the first heat dissipating plate 211 of negative pole.

The material of the first heat dissipating plate 211 of negative pole preferably has a low electric resistance and a coefficient of linear expansion equivalent to that of the base 231 of the rectifier element. A material having a low electric resistance can reduce heat generation loss caused by a power generation current, and it becomes possible to realize further improvements in efficiency and temperature reduction of the rectifier element of negative pole.

The first heat dissipating plate 211 of negative pole is preferably made of copper and is desirably fabricated as a sheet stamping part, which can be manufactured at low cost.

The second heat dissipating plate 212 of negative pole is disposed so as to cover the first heat dissipating plate 211 of negative pole, and is provided with a large number of heat dissipating fins in the upper and lower faces thereof to improve heat dissipating performance.

The second heat dissipating plate 212 of negative pole is preferably made of a material having a high thermal conductivity, and is desirably fabricated by a low-cost and high-productivity process, for example, aluminum die-casting to provide a large number of heat dissipating fins. Integrally forming the second heat dissipating plate 212 of negative pole with the first heat dissipating plate 211 of negative pole by aluminum die-casting will make up a heat dissipating plate 21 of negative pole which is formed of two kinds of materials and is low in cost and excellent in productivity.

As so far described, according to the present embodiment, by configuring the heat dissipating plate to have a dual structure made up of, depending on purposes, a first heat dissipating plate in which current loss is minimized and a second heat dissipating plate in which heat dissipating performance is enhanced, it is possible to provide an automotive alternator including a high quality rectifier, which can reduce heat generation loss due to a large current at the first heat dissipating plate and improve the heat dissipating performance at the second dissipating plate, thereby promoting the temperature reduction of the rectifier element, and which is suitable for realizing a high output power.

Moreover, by arranging that the material of the first heat dissipating plate has a coefficient of liner expansion equivalent to that of the material of the press-fit portion of the rectifier element, it is possible to provide an automotive alternator including a high quality rectifier without allowing the gap at the press-fit portion to expand due to a temperature change and thereby increase heat resistance.

Furthermore, by adopting aluminum die-casting, the second heat dissipating plate can be integrally formed as an aluminum die-cast with the first heat dissipating plate, which has a high melting point, being as an insert, and it is possible to provide an automotive alternator including a rectifier having low-cost heat dissipating plates.

Second Embodiment

Next, a second embodiment will be described based on FIGS. 7 to 10.

Figure 7:
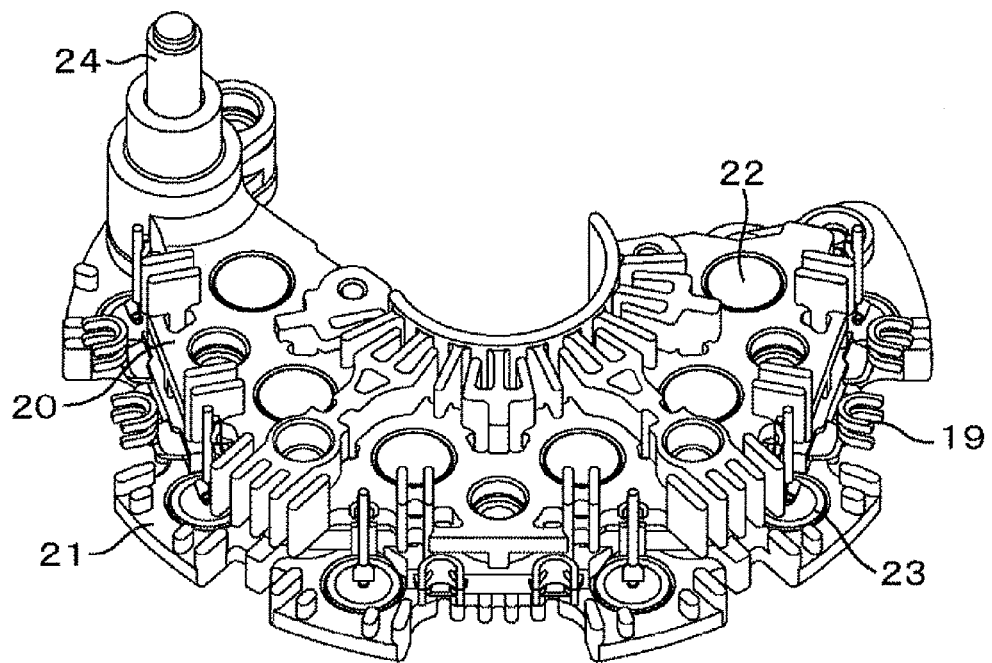
FIG. 7 is a perspective view of a rectifier according to a second embodiment of the present invention.
Figure 8:
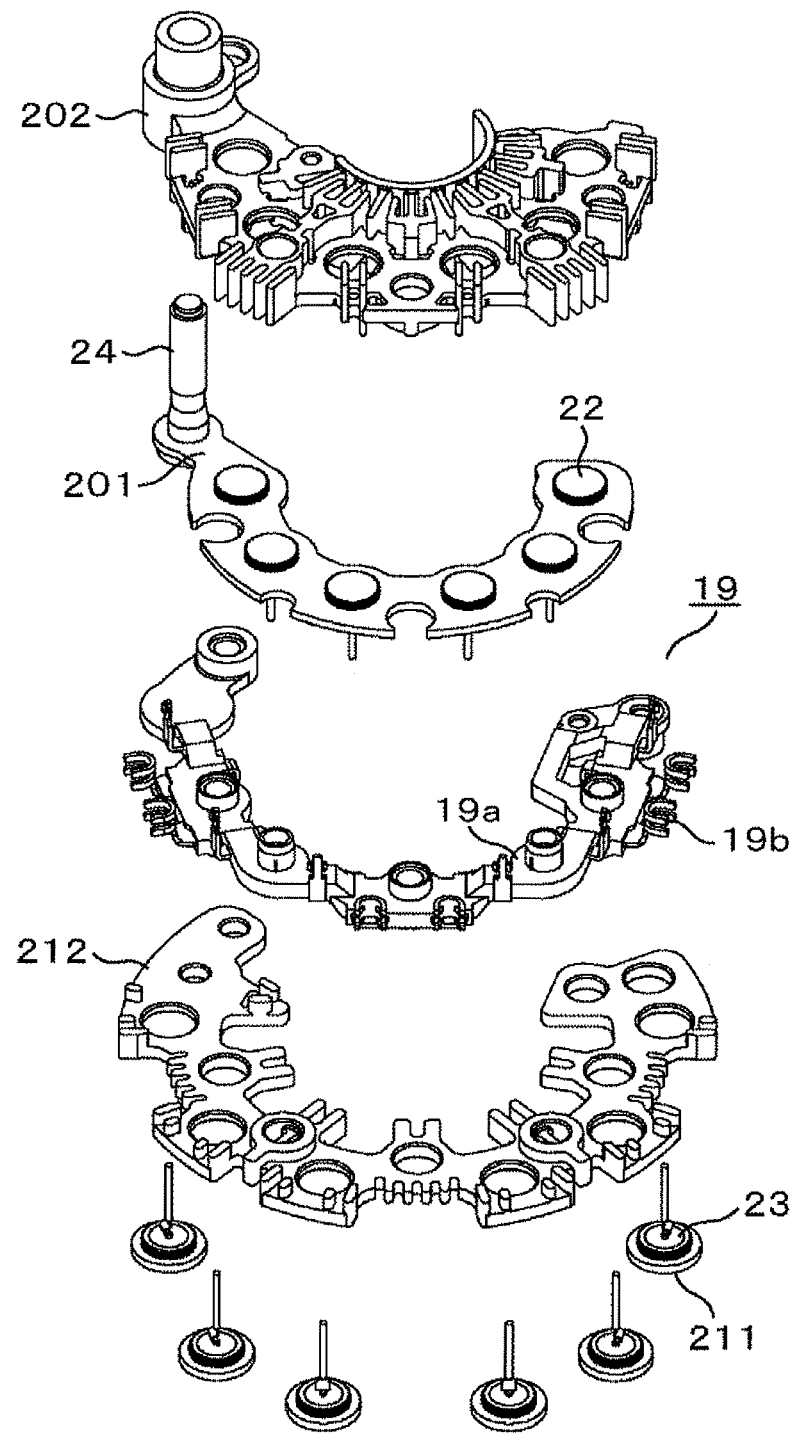
FIG. 8 is an exploded view of the rectifier according to the second embodiment of the present invention.
Figure 9:
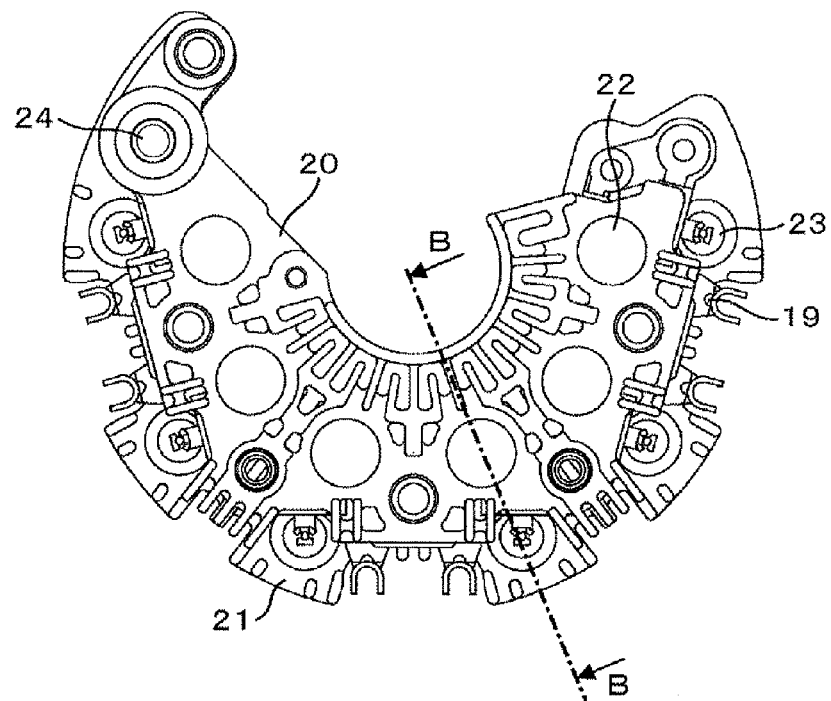
FIG. 9 is a rear side front view of the rectifier according to the second embodiment of the present invention.
Figure 10:
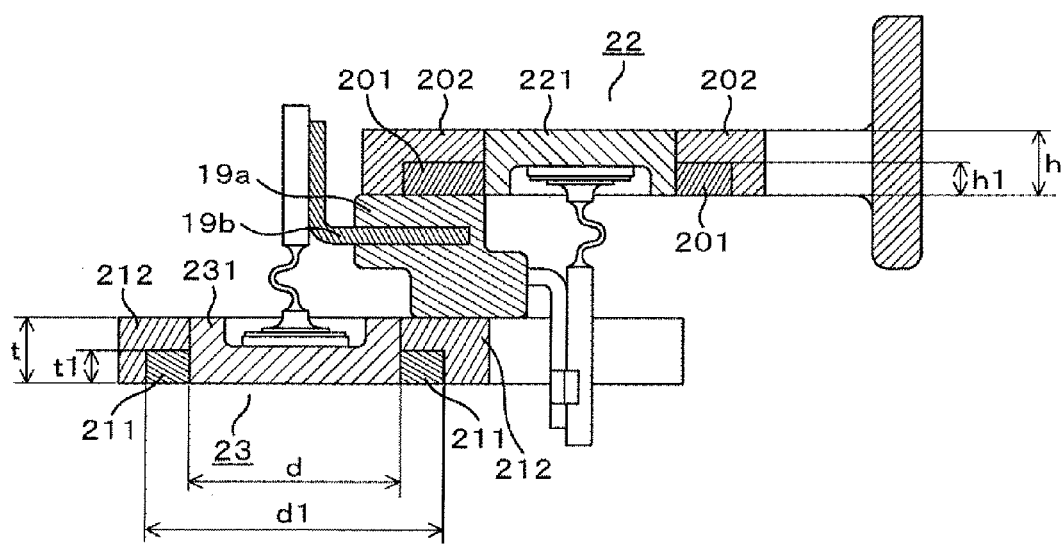
FIG. 10 is a view taken along a B-B section of FIG. 9.

FIG. 7 is a perspective view of a rectifier according to a second embodiment of the present invention. FIG. 8 is an exploded view of a rectifier according to the second embodiment of the present invention. FIG. 9 is a rear side front view of a rectifier according to the second embodiment of the present invention. FIG. 10 is a view taken along a B-B section of FIG. 9.

While in the first embodiment, the first heat dissipating plate is configured to have a shape to electrically link rectifier elements and to be provided with a plurality of holes in a horseshoe-shaped plate so that each rectifier element 23 is press-fit thereinto, thereby being electrically connected, since the lower face of the rectifier element 23 of negative pole is configured to come into contact with the rear frame 17, there is no need of electrically connecting the rectifier elements 23 with the first heat dissipating plate 211 of negative pole, unlike the first heat dissipating plate 201 of positive pole. Therefore, in the present embodiment, by dividing the first heat dissipating plate 211 of negative pole in accordance with the number of rectifier elements as shown in FIG. 8, and making it have a cylindrical shape which is excellent in productivity, it is possible to provide a rectifier having low-cost heat dissipating plates.

The thickness t1 of the first heat dissipating plate 211 of negative pole is preferably arranged to be in a range of 1/4 to 2/3 with respect to the thickness 't' of the base 231 portion of the rectifier element 23 of negative pole thereby suppressing the use amount of the material of the first heat dissipating plate 211 of negative pole to be minimum, and the base 231 of the rectifier element 23 of negative pole is desirably press-fit into the first heat dissipating plate 211 of negative pole.

Moreover, the size of the first heat dissipating plate 211 of negative pole is desirably arranged such that the outer diameter d1 of the first heat dissipating plate 211 of negative pole is not less than 1.2 times of the outer diameter 'd' of the rectifier element 23 of negative pole.

The material of the first heat dissipating plate 211 of negative pole preferably has a low electric resistance and a coefficient of linear expansion equivalent to that of the base 231 of the rectifier element. A material having a low electric resistance can reduce heat generation loss caused by a power generation current, making it possible to realize further improvements in efficiency and temperature reduction of the rectifier element of negative pole. The first heat dissipating plate 211 of negative pole is preferably made of copper and is desirably fabricated as a sheet stamping part, which can be manufactured at low cost.

The second heat dissipating plate 212 of negative pole is disposed so as to cover the first heat dissipating plate 211 of negative pole, and is provided with a large number of heat dissipating fins in the upper and lower faces thereof to improve heat dissipating performance. The second heat dissipating plate 212 of negative pole is preferably made of a material having a high thermal conductivity, and is desirably fabricated by a low-cost and high-productivity process, for example, aluminum die-casting to provide a large number of heat dissipating fins. Integrally forming the second heat dissipating plate 212 of negative pole with the first heat dissipating plate 211 of negative pole by aluminum die-casting will make up a heat dissipating plate 21 of negative pole which is formed of two kinds of materials and is low in cost and excellent in productivity.

As so far described, according to the present embodiment, by configuring the heat dissipating plate to have a dual structure made up of, depending on purposes, a first heat dissipating plate in which current loss is minimized and a second heat dissipating plate in which heat dissipating performance is enhanced, it is possible to provide an automotive alternator including a high quality rectifier, which can reduce heat generation loss due to a large current at the first heat dissipating plate and improve the heat dissipating performance at the second dissipating plate, thereby promoting the temperature reduction of the rectifier element, and which is suitable for realizing a high output power.

Moreover, by arranging that the material of the first heat dissipating plate has a coefficient of liner expansion equivalent to that of the material of the press-fit portion of the rectifier element, it is possible to provide an automotive alternator including a high quality rectifier without allowing the gap at the press-fit portion to expand due to a temperature change and thereby increase heat resistance.

Furthermore, by adopting aluminum die-casting, the second heat dissipating plate can be integrally formed as an aluminum die-cast with the first heat dissipating plate, which has a high melting point, being as an insert, and it is possible to provide an automotive alternator including a rectifier having low-cost heat dissipating plates by configuring the first heat dissipating plate of negative pole to be a relatively simple cylindrical shape.

Third Embodiment

Next, a third embodiment will be described based on FIGS. 11 to 14.

Figure 11:
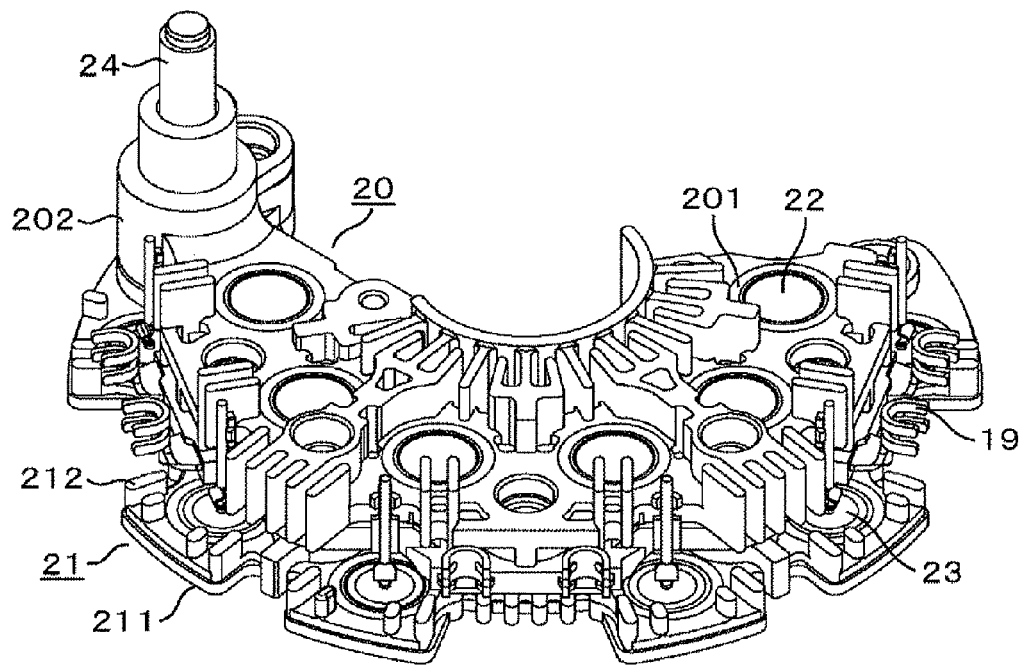
FIG. 11 is a perspective view of a rectifier according to a third embodiment of the present invention.
Figure 12:
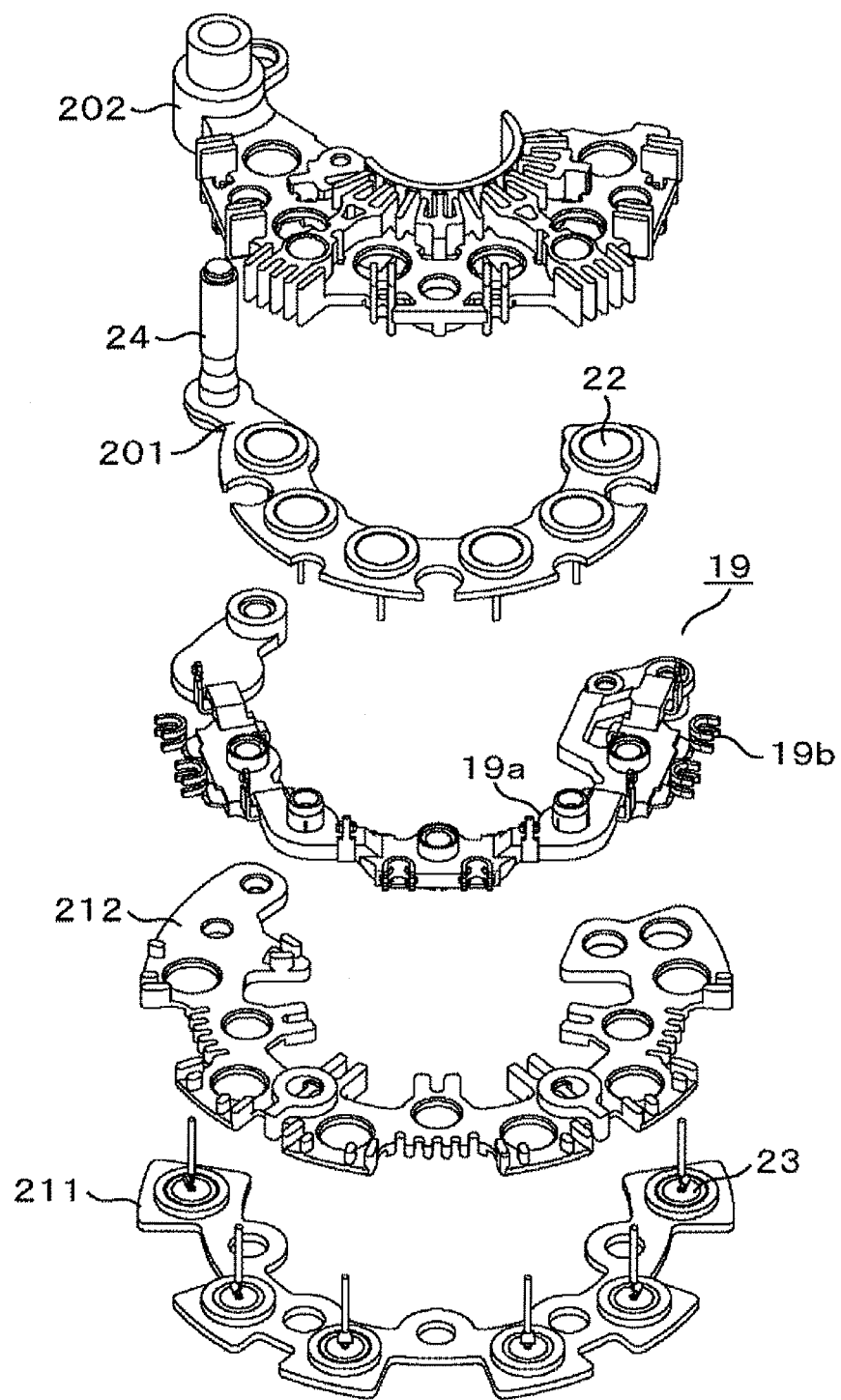
FIG. 12 is an exploded view of the rectifier according to the third embodiment of the present invention.
Figure 13:
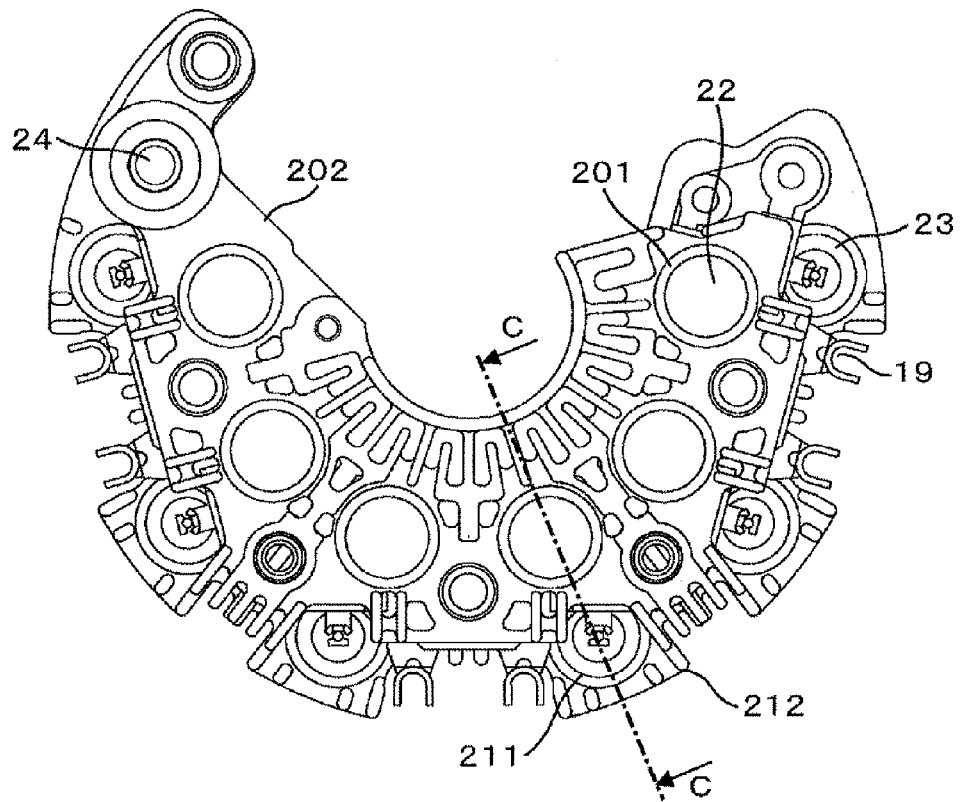
FIG. 13 is a rear side front view of the rectifier according to the third embodiment of the present invention.
Figure 14:
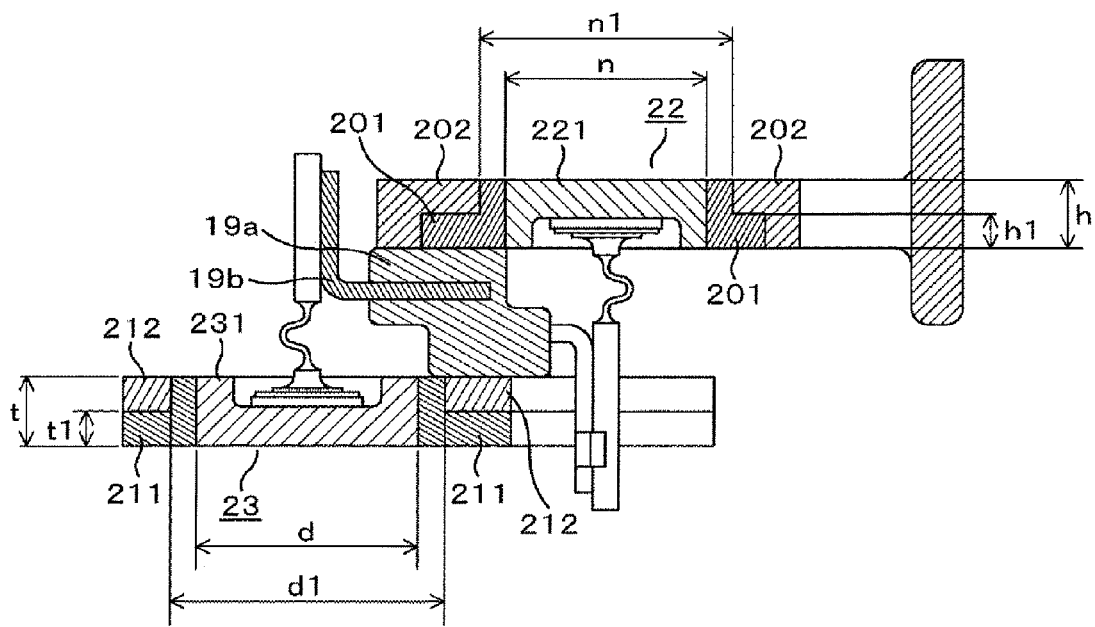
FIG. 14 is a view taken along a C-C section of FIG. 13.

FIG. 11 is a perspective view of a rectifier according to a third embodiment of the present invention. FIG. 12 is an exploded view of the rectifier according to the third embodiment of the present invention. FIG. 13 is a rear side front view of the rectifier according to the third embodiment of the present invention. FIG. 14 is a view taken along a C-C section of FIG. 13.

While in the first and second embodiments, the electric loss is reduced by the first heat dissipating plate in which a material having a low electric resistance is adopted partly for the press-fit portion with the rectifier element; in the present embodiment, the press-fit portion with the rectifier element is entirely made up of the first heat dissipating plate.

The heat dissipating plate 20 of positive pole is made up of a dual structure in which the first heat dissipating plate 201 of positive pole and the second heat dissipating plate 202 of positive pole are made of different materials as shown in FIGS. 11 to 14, and the first heat dissipating plate 201 of positive pole is shaped so as to electrically link the rectifier elements of positive pole with the B-terminal bolt 24 as shown in FIG. 12, and is provided with a plurality of holes in a horseshoe-shaped plate so that each rectifier element 22 of positive pole and the B-terminal bolt 24 are press-fit thereinto, thereby being electrically connected.

Respective rectifier elements 22 of positive pole are linked with the B-terminal bolt 24 by the first heat dissipating plate of positive pole to constitute wiring for an electric circuit which supplies power to the automobile side.

The press-fit portion of the rectifier element 22 of positive pole is configured such that the thickness of the first heat dissipating plate 211 of positive pole is also made to be h with respect to the thickness 'h' of the base 221 of the rectifier element 22 of positive pole so that the entire rectifier element 22 of positive pole are covered by the first heat dissipating plate.

However, since the material cost will increase as the use amount of the first heat dissipating plate of positive pole increases, only the vicinity of the press-fit portion of the base 221 of the rectifier element 22 of positive pole in the heat dissipating plate of positive pole is made to have a thickness 'h', and the plate thickness of the first heat dissipating plate 201 of positive pole excepting the press-fit portion is made to be as thin as h1. The thickness h1 of first heat dissipating plate 201 of positive pole is preferably made to be 1/4 to 1/2 with respect to the thickness 'h' of the base 221 portion of the rectifier element 22 of positive pole thereby suppressing the use amount of the material of the first heat dissipating plate 201 of positive pole to be minimum, and only the press-fit portion surrounding the base 221 of the rectifier element 22 of positive pole is configured to have a convex shape.

The diameter n1 of the press-fit portion of the first heat dissipating plate 201 of positive pole is desirably made to be 1.2 to 1.5 times with respect to the outer diameter 'n' of the rectifier element 22 of positive pole.

The material of the first heat dissipating plate 201 of positive pole preferably has a low electric resistance and a coefficient of linear expansion equivalent to that of the base 221 of the rectifier element. A material having a low electric resistance can reduce heat generation loss caused by a power generation current, making it possible to realize further improvements in efficiency and temperature reduction of the rectifier element of positive pole. Even when compared with the first and second embodiments, the contact ratio between the first heat dissipating plate 201 of positive pole and the rectifier element 22 of positive pole is high, so that the power generation current can be supplied to the automobile side with little loss.

The first heat dissipating plate 201 of positive pole is preferably made of copper and is desirably fabricated as a sheet stamping part, which can be manufactured at low cost.

The second heat dissipating plate 202 of positive pole is disposed so as to cover of the first heat dissipating plate 201 of positive pole, and is provided with a large number of heat dissipating fins in the upper and lower faces thereof to improve heat dissipating performance. The second heat dissipating plate 202 of positive pole is preferably made of a material having a high thermal conductivity, and is desirably fabricated by a low-cost and high-productivity process, for example, aluminum die-casting to provide a large number of heat dissipating fins. Integrally forming the second heat dissipating plate 202 of positive pole with the material of the first heat dissipating plate 201 of positive pole by aluminum die-casting will make up a heat dissipating plate 20 of positive pole which is low in cost and excellent in productivity.

The heat dissipating plate 21 of negative pole is made up of a dual structure in which the first heat dissipating plate 211 of negative pole and the second heat dissipating plate 212 of negative pole are made of different materials as shown in FIGS. 11 to 14, and the first heat dissipating plate 211 of negative pole is shaped so as to electrically link a plurality of the rectifier elements 23 of negative pole and is provided with a plurality of holes in a horseshoe-shaped plate so that each rectifier element 23 is press-fit thereinto, thereby being electrically connected.

Respective rectifier elements 23 of negative pole are linked by the first heat dissipating plate 211 of negative pole to constitute wiring for an electric circuit which supplies power to the automobile side.

Further, the first heat dissipating plate 211 of negative pole is disposed on the rear frame 17 side to be positioned in direct contact therewith to constitute wiring for an electric circuit which has a low electric loss and connects to the earth of the automobile side.

The press-fit portion of the rectifier element 23 of negative pole is configured such that the thickness of the first heat dissipating plate 211 of negative pole is made to be 't', which is the same as the thickness 't' of the base 231 of the rectifier element 23 of negative pole, so that the entire rectifier element 23 of negative pole is covered with the first heat dissipating plate.

However, since the material cost will increase as the use amount of the first heat dissipating plate of negative pole increases, only the vicinity of the press-fit portion of the base 231 of the rectifier element 23 of negative pole in the heat dissipating plate of negative pole is made to have a thickness 't', and the plate thickness of the first heat dissipating plate 211 of negative pole excepting the press-fit portion is made to be as thin as t1, thereby decreasing the use amount of material as much as possible. The thickness t1 of first heat dissipating plate 211 of negative pole is preferably made to be 1/4 to 1/2 with respect to the thickness 't' of the base 231 portion of the rectifier element 23 of negative pole thereby suppressing the use amount of the material of the first heat dissipating plate 211 of negative pole to be minimum, and only the press-fit portion surrounding the base 231 of the rectifier element 23 of negative pole is configured to have a convex shape.

The diameter dl of the press-fit portion of the first heat dissipating plate 211 of negative pole is desirably made to be 1.2 to 1.5 times with respect to the outer diameter 'd' of the rectifier element 23 of negative pole.

The material of the first heat dissipating plate 211 of negative pole preferably has a low electric resistance and a coefficient of linear expansion equivalent to that of the base 231 of the rectifier element. A material having a low electric resistance can reduce heat generation loss caused by a power generation current, making it possible to realize further improvements in efficiency and temperature reduction of the rectifier element of positive pole. Even when compared with the first and second embodiments, the contact ratio between the first heat dissipating plate 201 of negative pole and the rectifier element 23 of negative pole is high, so that the power generation current can be supplied to the automobile side with little loss.

The first heat dissipating plate 211 of negative pole is preferably made of copper and is desirably fabricated as a sheet stamping part, which can be manufactured at low cost.

The second heat dissipating plate 212 of negative pole is disposed so as to cover the first heat dissipating plate 211 of negative pole, and is provided with a large number of heat dissipating fins in the upper and lower faces thereof to improve heat dissipating performance. The second heat dissipating plate 212 of negative pole is preferably made of a material having a high thermal conductivity, and is desirably fabricated by a low-cost and high-productivity process, for example, aluminum die-casting to provide a large number of heat dissipating fins. Integrally forming the second heat dissipating plate 212 of negative pole with the material of the first heat dissipating plate 211 of negative pole by aluminum die-casting will make up a heat dissipating plate 21 of negative pole which is low in cost and excellent in productivity.

As so far described, according to the present embodiment, by configuring the heat dissipating plate to have a dual structure made up of, depending on purposes, a first heat dissipating plate in which current loss is minimized and a second heat dissipating plate in which heat dissipating performance is enhanced, it is possible to provide an automotive alternator including a high quality rectifier, which can reduce heat generation loss due to a large current at the first heat dissipating plate and improve heat dissipating performance at the second dissipating plate, thereby promoting the temperature reduction of the rectifier element, and which is suitable for realizing a high output power.

Moreover, by arranging that the material of the first heat dissipating plate has a coefficient of liner expansion equivalent to that of the material of the press-fit portion of the rectifier element, it is possible to provide an automotive alternator including a high quality rectifier without allowing the gap at the press-fit portion to expand due to a temperature change and thereby increase heat resistance.

Further, by adopting aluminum die-casting, the second heat dissipating plate can be integrally formed as an aluminum die-cast with the first heat dissipating plate, which has a high melting point, being as an insert, and it is possible to provide an automobile alternator including a rectifier having low-cost heat dissipating plates.

Fourth Embodiment

Next, a fourth embodiment will be described based on FIGS. 15 to 18.

Figure 15:
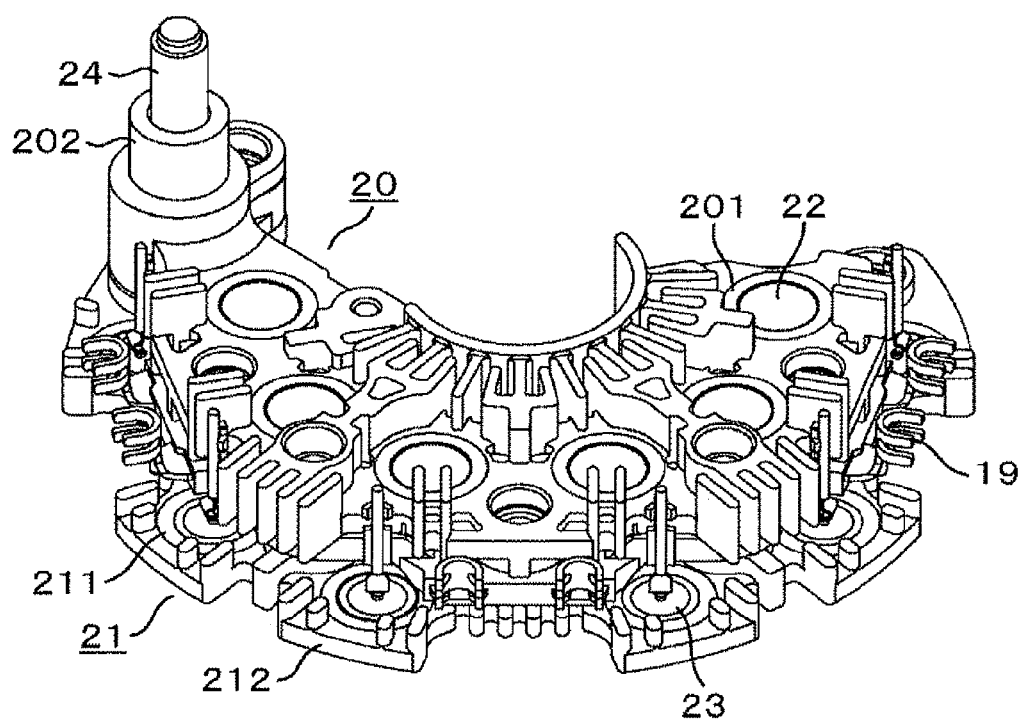
FIG. 15 is a perspective view of a rectifier according to a fourth embodiment of the present invention.
Figure 16:
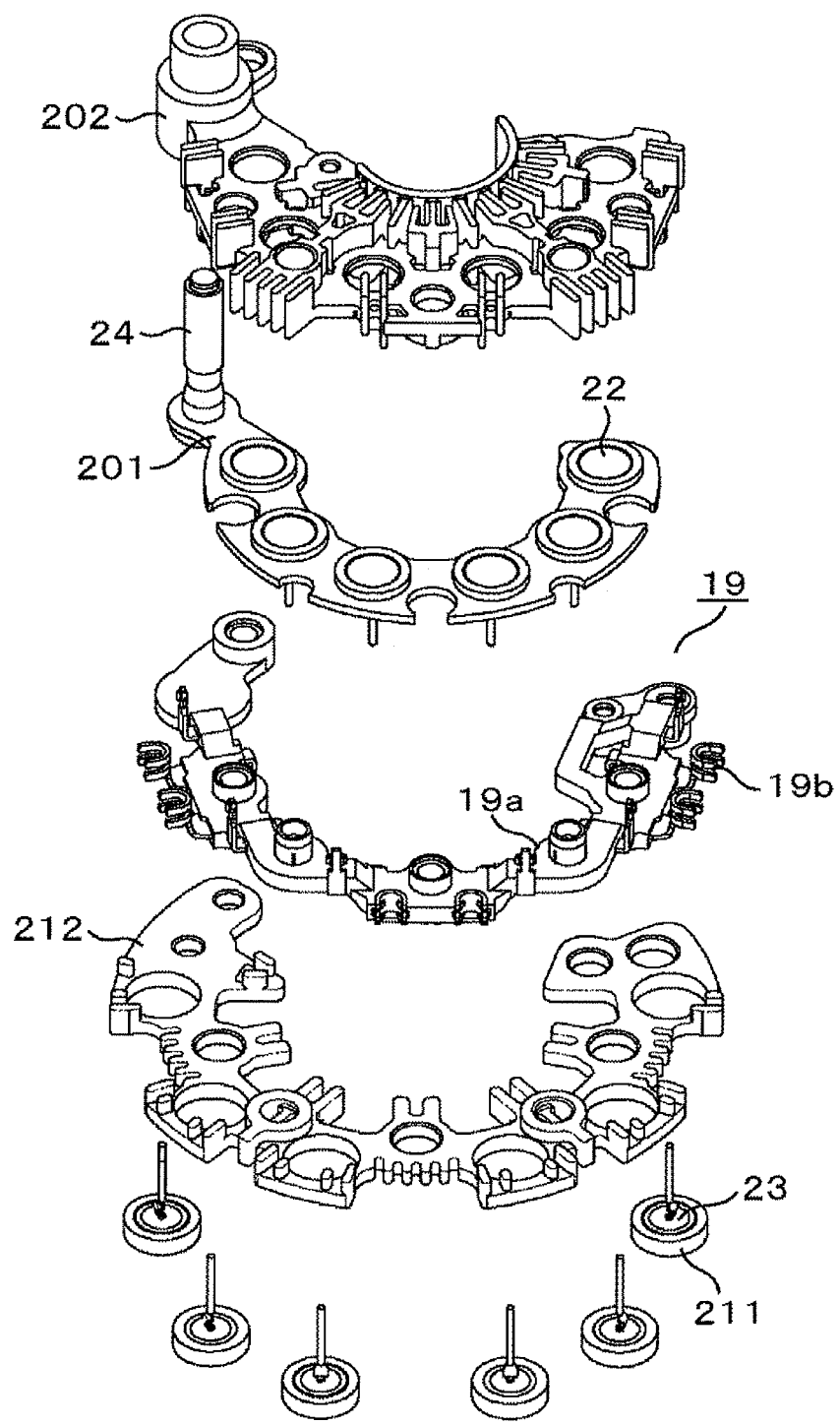
FIG. 16 is an exploded view of the rectifier according to the fourth embodiment of the present invention.
Figure 17:
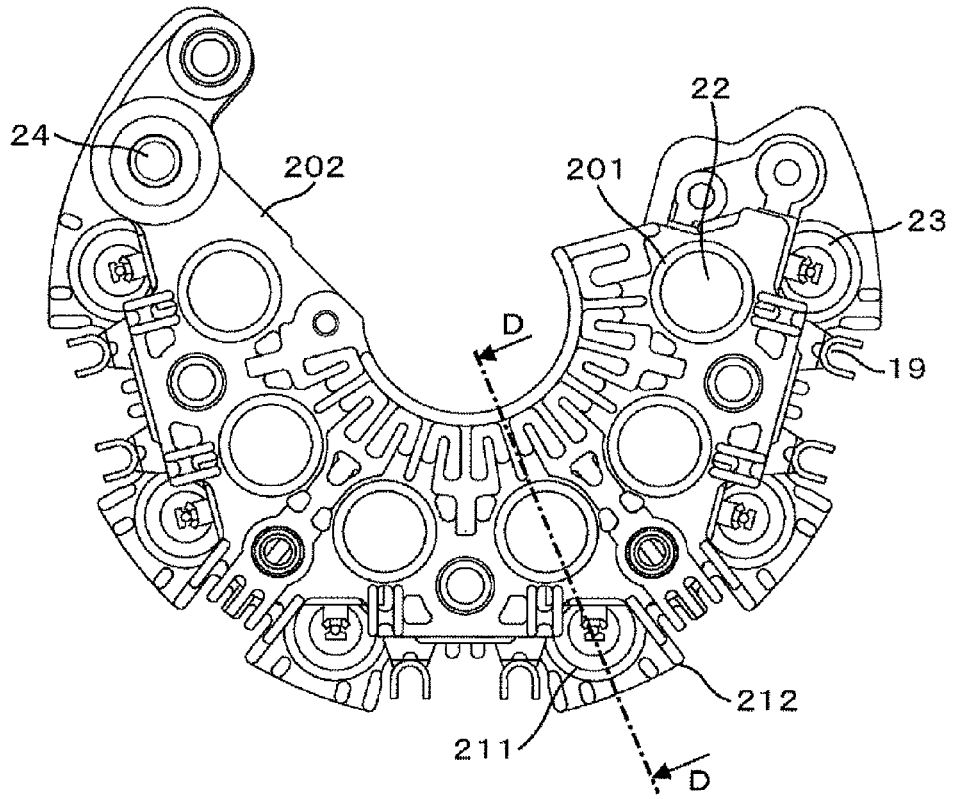
FIG. 17 is a rear side front view of the rectifier according to the fourth embodiment of the present invention.
Figure 18:
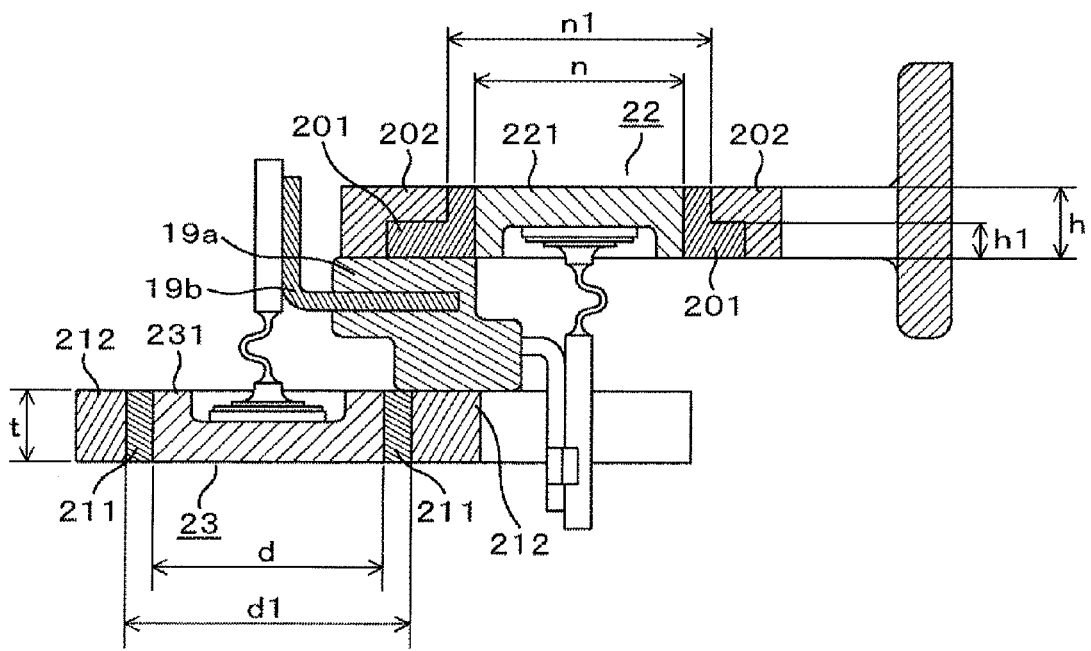
FIG. 18 is a view taken along a D-D section of FIG. 17.

FIG. 15 is a perspective view of a rectifier according to a fourth embodiment of the present invention. FIG. 16 is an exploded view of a rectifier according to the fourth embodiment of the present invention. FIG. 17 is a rear side front view of a rectifier according to the fourth embodiment of the present invention. FIG. 18 is a view taken along a D-D section of FIG. 17.

While in the third embodiment, the first heat dissipating plate is configured to have a shape to electrically link rectifier elements, to be provided with a plurality of holes in a horseshoe-shaped plate, and to have a convex shape in the press-fit portion of each rectifier element so that the entire thickness of each rectifier element is press-fit into the first heat dissipating plate, thereby suppressing the electrical loss to be minimum and providing electrical connection, since the lower face of the rectifier element 23 of negative pole is configured to come into contact with the rear frame 17, there is no need of electrically connecting the rectifier elements 23 with the first heat dissipating plate 211 of negative pole, unlike the first heat dissipating plate 201 of positive pole. Therefore, in the present embodiment, by dividing the first heat dissipating plate 211 of negative pole in accordance with the number of rectifier elements as shown in FIG. 16, and making it have a cylindrical shape which is excellent in productivity, it is possible to provide a rectifier having low-cost heat dissipating plates.

The thickness of the first heat dissipating plate 211 of negative pole is configured to be the same as the thickness of the base 231 portion of the rectifier element 23 of negative pole; the size of the first heat dissipating plate 211 of negative pole is desirably arranged such that the outer diameter dl of the first heat dissipating plate 211 of negative pole is not less than 1.2 times with respect to the outer diameter 'd' of the rectifier element 23 of negative pole as shown in FIG. 18; and the shape thereof is desirably a cylindrical shape.

The material of the first heat dissipating plate 211 of negative pole preferably has a low electric resistance and a coefficient of linear expansion equivalent to that of the base 231 of the rectifier element. A material having a low electric resistance can reduce heat generation loss caused by a power generation current, making it possible to realize further improvements in efficiency and temperature reduction of the rectifier element of negative pole. The first heat dissipating plate 211 of negative pole is preferably made of copper and is desirably fabricated as a sheet stamping part, which can be manufactured at low cost.

The second heat dissipating plate 212 of negative pole is disposed so as to cover a plurality of first heat dissipating plates 211 of negative pole, and provided with a large number of heat dissipating fins in the upper and lower faces thereof to improve heat dissipating performance. The second heat dissipating plate 212 of negative pole is preferably made of a material having a high thermal conductivity, and is desirably fabricated by a low-cost and high-productivity process, for example, aluminum die-casting to provide a large number of heat dissipating fins. Integrally forming the second heat dissipating plate 212 of negative pole with the first heat dissipating plate 211 of negative pole by aluminum die-casting will make up a heat dissipating plate 21 of negative pole which is formed of two kinds of materials and is low in cost and excellent in productivity.

As so far described, according to the present embodiment, by configuring the heat dissipating plate to have a dual structure made up of, depending on purposes, a first heat dissipating plate in which current loss is minimized and a second heat dissipating plate in which heat dissipating performance is enhanced, it is possible to provide an automotive alternator including a high quality rectifier, which can reduce heat generation loss due to a large current at the first heat dissipating plate and improve the heat dissipating performance at the second dissipating plate, thereby promoting the temperature reduction of the rectifier element, and which is suitable for realizing a high output power.

Moreover, by arranging that the material of the first heat dissipating plate has a coefficient of liner expansion equivalent to that of the material of the press-fit portion of the rectifier element, it is possible to provide an automotive alternator including a high quality rectifier without allowing the gap at the press-fit portion to expand due to a temperature change and thereby increasing heat resistance.

Further, by adopting aluminum die-casting, the second heat dissipating plate can be integrally formed as an aluminum die-cast with the first heat dissipating plate, which has a high melting point, being as an insert, and it is possible to provide an automobile alternator including a rectifier having low-cost heat dissipating plates by configuring the first heat dissipating plate of negative pole to be a relatively simple cylindrical shape.

Fifth Embodiment

Next, a fifth embodiment will be described based on FIGS. 19 to 22.

Figure 19:
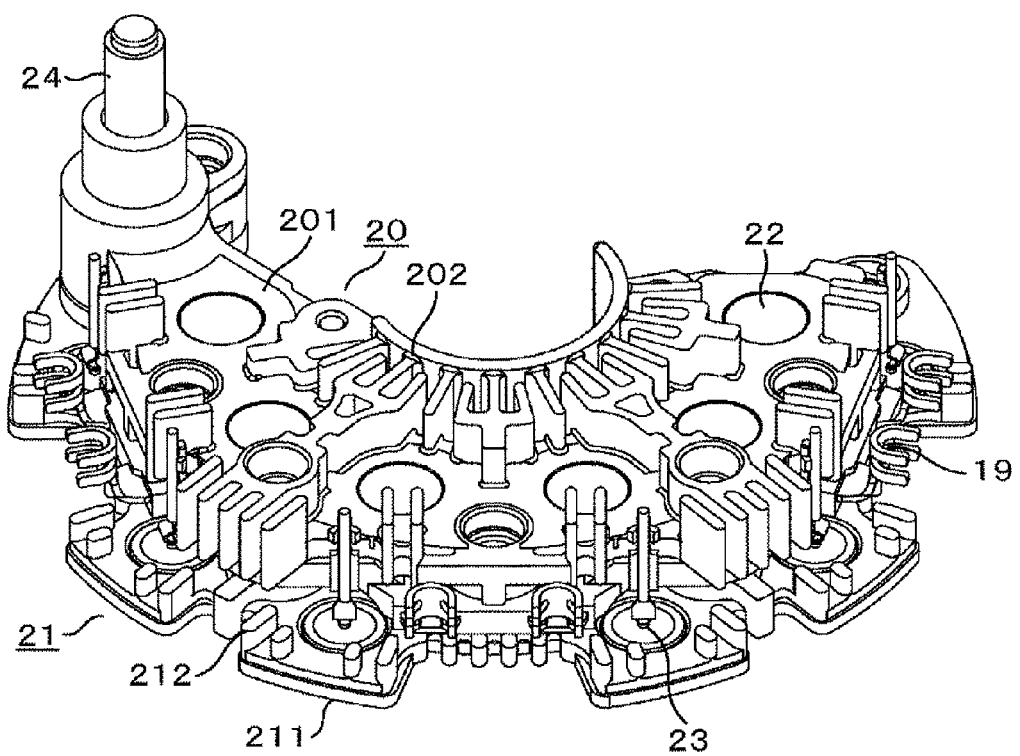
FIG. 19 is a perspective view of a rectifier according to a fifth embodiment of the present invention.
Figure 20:
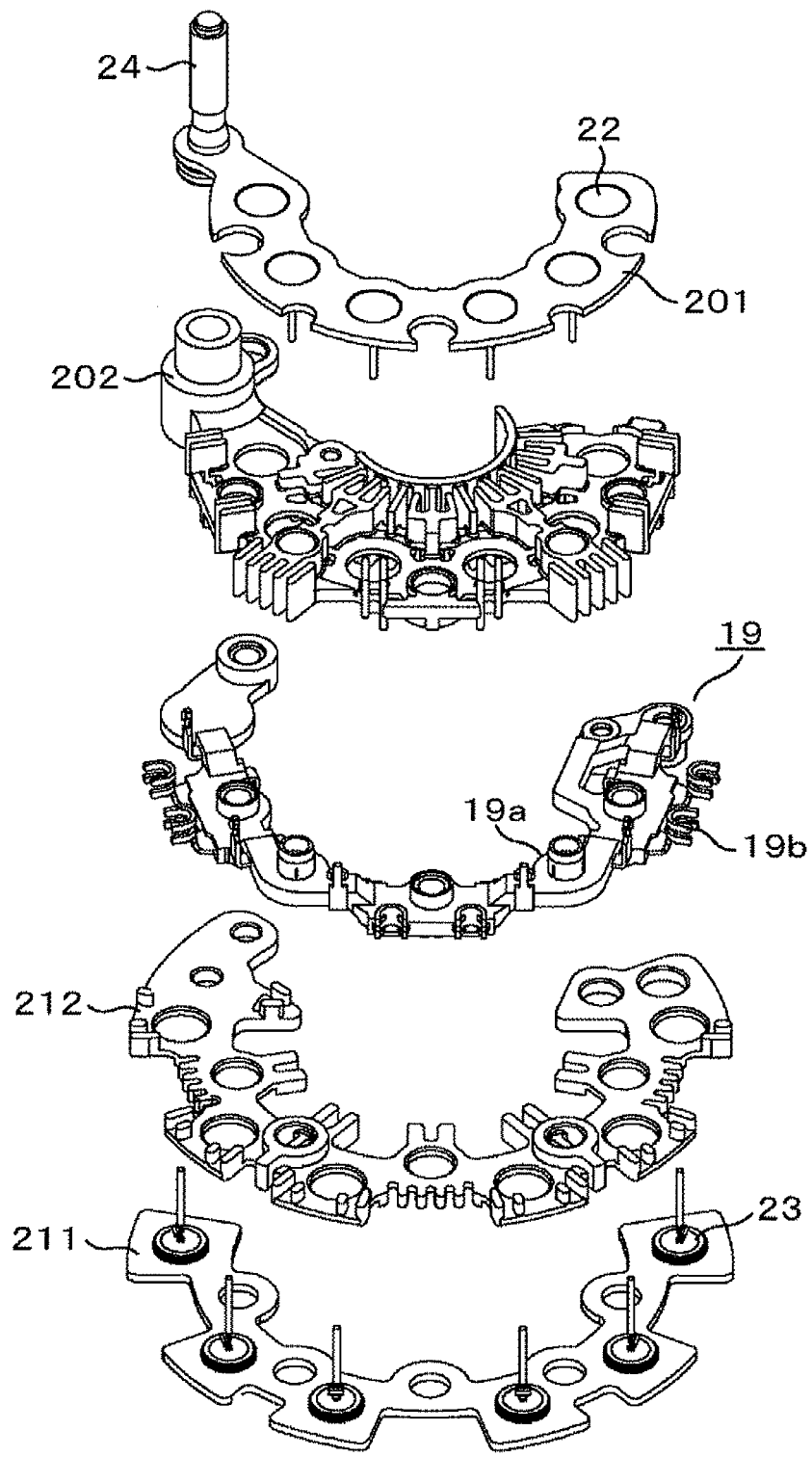
FIG. 20 is an exploded view of the rectifier according to the fifth embodiment of the present invention.
Figure 21:
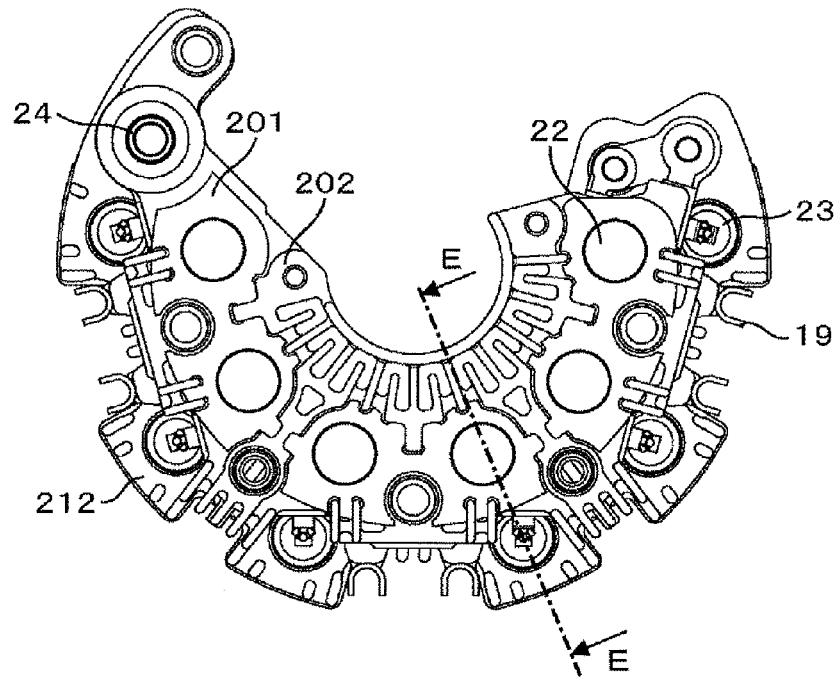
FIG. 21 is a rear side front view of the rectifier according to the fifth embodiment of the present invention.
Figure 22:
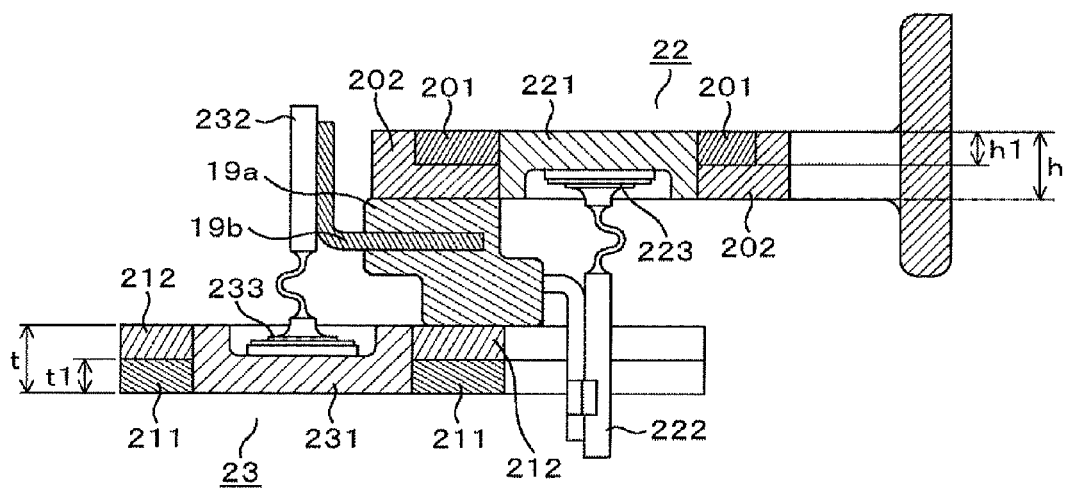
FIG. 22 is a view taken along an E-E section of FIG. 21.

FIG. 19 is a perspective view of a rectifier according to a fifth embodiment of the present invention. FIG. 20 is an exploded view of a rectifier according to the fifth embodiment of the present invention. FIG. 21 is a rear side front view of a rectifier according to the fifth embodiment of the present invention. FIG. 22 is a view taken along an E-E section of FIG. 21.

The base 221, which is the press-fit portion of the rectifier element 22 of positive pole, has a concave shape. In the first and second embodiments, the position of the press-fit is on the lead 222 side of the rectifier element 22 of positive pole, and the path from the chip 223 of rectifier element to the first heat dissipating plate is long, thereby causing loss of electricity in that part.

In the present embodiment, the press-fit position of the first heat dissipating plate 201 of positive pole is disposed on the opposite side of the lead 222 of the rectifier element 22 of positive pole as shown in FIGS. 19 to 22 so that the current path is reduced thereby reducing electric loss.

Further, as the result of that the concave-shaped bottom face of the press-fit portion of the rectifier element 22 of positive pole is press-fit into the first heat dissipating plate 201 of positive pole and a gap between the second heat dissipating plate 202 of positive pole and the rectifier element 22 of positive pole is provided so that the stress at the time of press-fitting into the chip and the stress due to temperature change are mitigated, thus providing a high-lifetime and high-quality rectifier.

It is desirable that the base 221 of the rectifier element 22 of positive pole is press-fit into the first heat dissipating plate 201 of positive pole by arranging that the plate thickness h1 of the first heat dissipating plate 201 of positive pole is preferably in a range of 1/4 to 2/3 with respect to the thickness 'h' of the base 221 portion of the rectifier element 22 of positive pole.

The material of the first heat dissipating plate 201 of positive pole preferably has a low electric resistance and a coefficient of linear expansion equivalent to that of the base 221 of the rectifier element. A material having a low electric resistance can reduce heat generation loss caused by a power generation current, making it possible to realize further improvements in efficiency and temperature reduction of the rectifier element 22 of positive pole. The first heat dissipating plate 201 of positive pole is preferably made of copper and is desirably fabricated as a sheet stamping part, which can be manufactured at low cost.

The second heat dissipating plate 202 of positive pole is disposed so as to cover the upper face of the first heat dissipating plate 201 of positive pole, and is provided with a large number of heat dissipating fins in the upper and lower faces thereof to improve heat dissipating performance. The second heat dissipating plate 202 of positive pole is preferably made of a material having a high thermal conductivity, and is desirably fabricated by a low-cost and high-productivity process, for example, aluminum die-casting to provide a large number of heat dissipating fins. Integrally forming the second heat dissipating plate 202 of positive pole with the material of the first heat dissipating plate 201 of positive pole by aluminum die-casting will make up a heat dissipating plate 20 of positive pole which is low in cost and excellent in productivity.

Adopting the same configuration for the heat dissipating plate 21 of negative pole as well, the same effect can be achieved in the configuration of the second embodiment which is a type in which the rectifier element 23 is electrically linked by the first heat dissipating plate 211 of negative pole as in the first embodiment.

As so far described, according to the present embodiment, by configuring the heat dissipating plate to have a dual structure made up of, depending on purposes, a first heat dissipating plate in which current loss is minimized and a second heat dissipating plate in which heat dissipating performance is enhanced, it is possible to provide an automotive alternator including a high quality rectifier, which can reduce heat generation loss due to a large current at the first heat dissipating plate and improve the heat dissipating performance at the second dissipating plate, thereby promoting the temperature reduction of the rectifier element, and which is suitable for realizing a high output power.

Moreover, by arranging that the material of the first heat dissipating plate has a coefficient of liner expansion equivalent to that of the material of the press-fit portion of the rectifier element, it is possible to provide an automotive alternator including a high quality rectifier, without allowing the gap at the press-fit portion to expand due to a temperature change and thereby increase heat resistance.

Further, by adopting aluminum die-casting, the second heat dissipating plate can be integrally formed as an aluminum die-cast with the first heat dissipating plate, which has a high melting point, being as an insert, it is possible to provide an automobile alternator including a rectifier having low-cost heat dissipating plates.

Sixth Embodiment

Next, a sixth embodiment will be described based on FIGS. 23 to 26.

Figure 23:
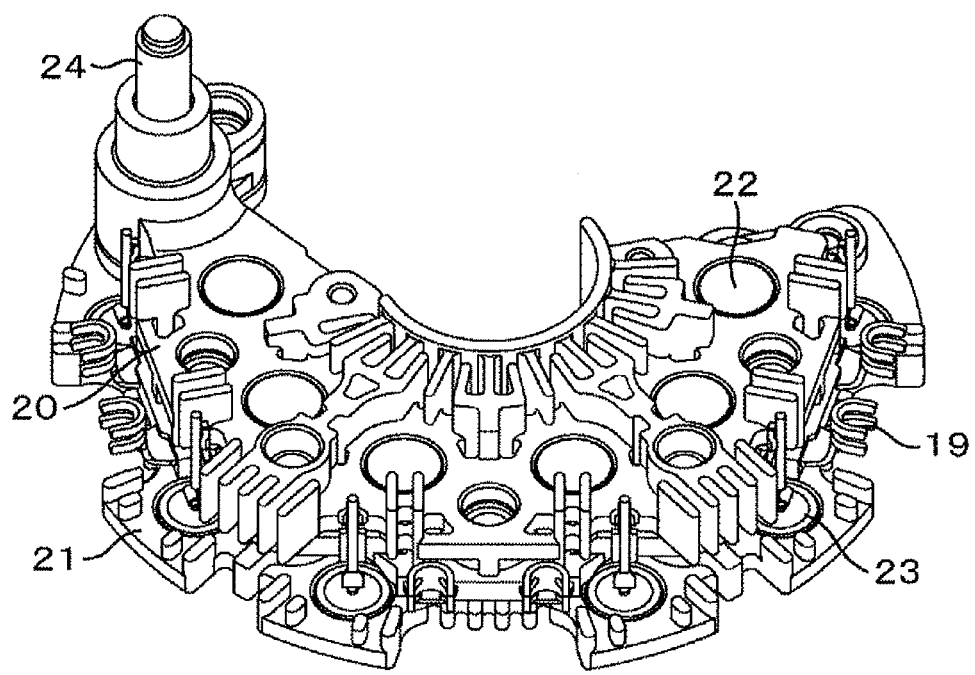
FIG. 23 is a perspective view of a rectifier according to a sixth embodiment of the present invention.
Figure 24:
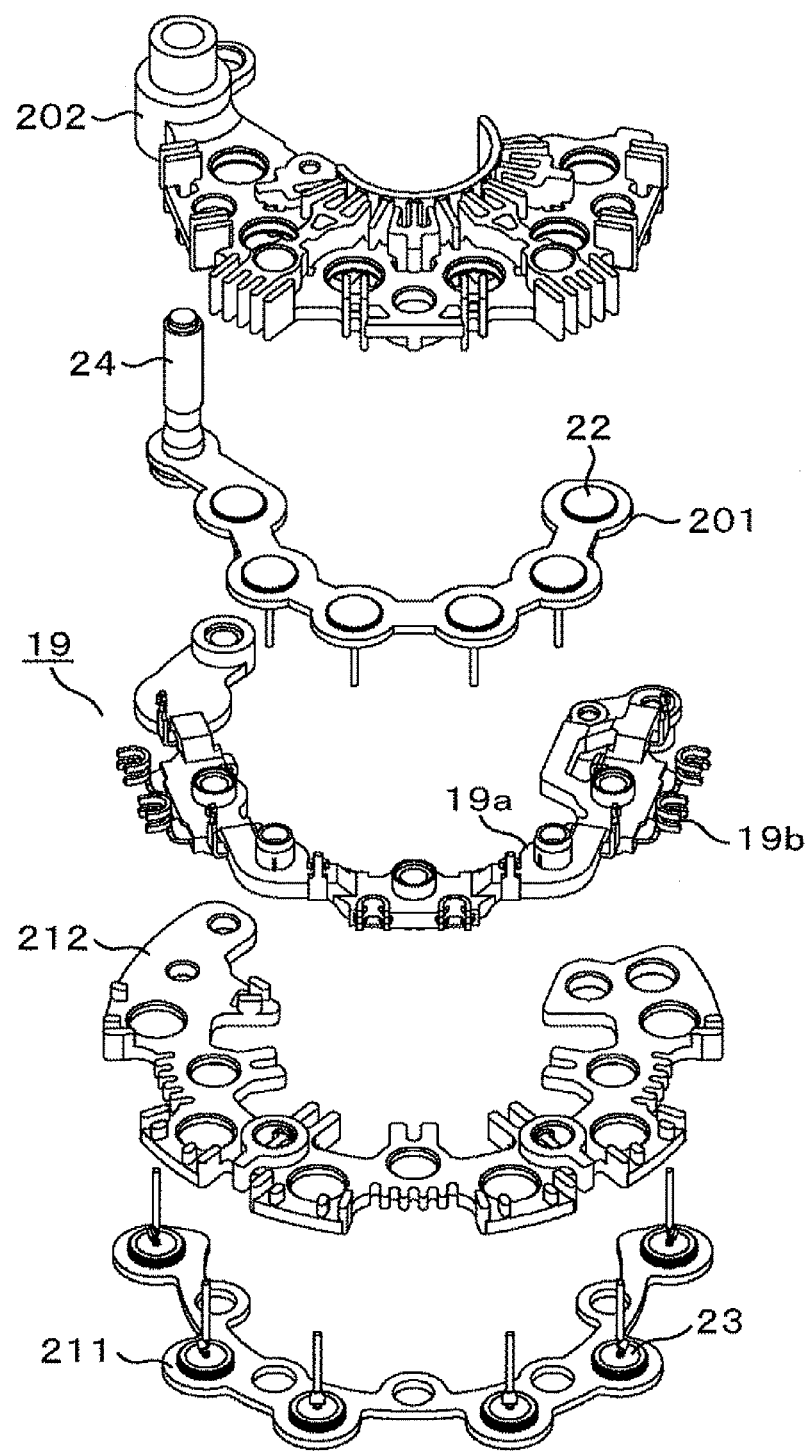
FIG. 24 is an exploded view of the rectifier according to the sixth embodiment of the present invention.
Figure 25:
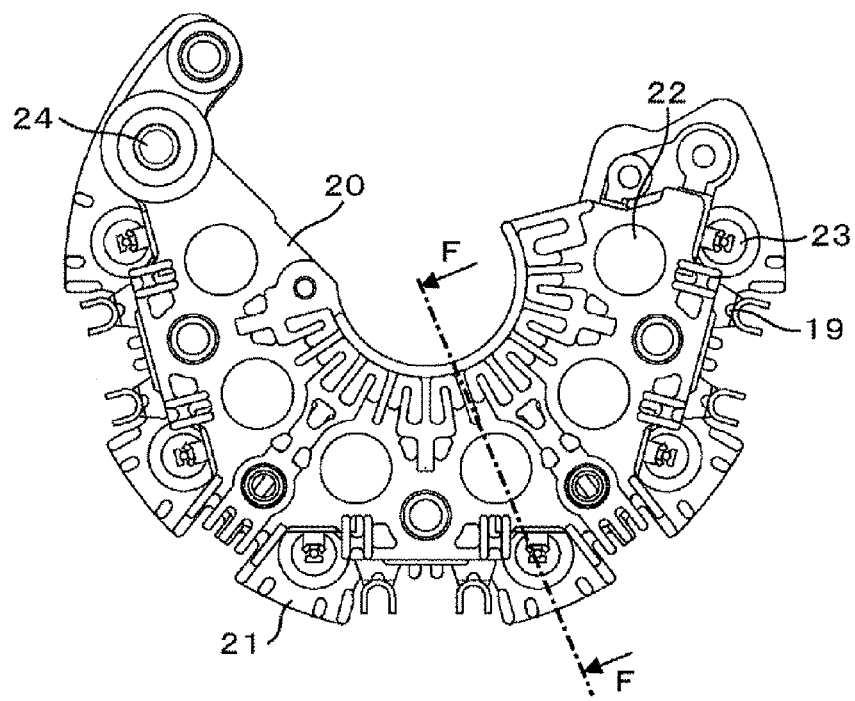
FIG. 25 is a rear side front view of the rectifier according to the sixth embodiment of the present invention.
Figure 26:
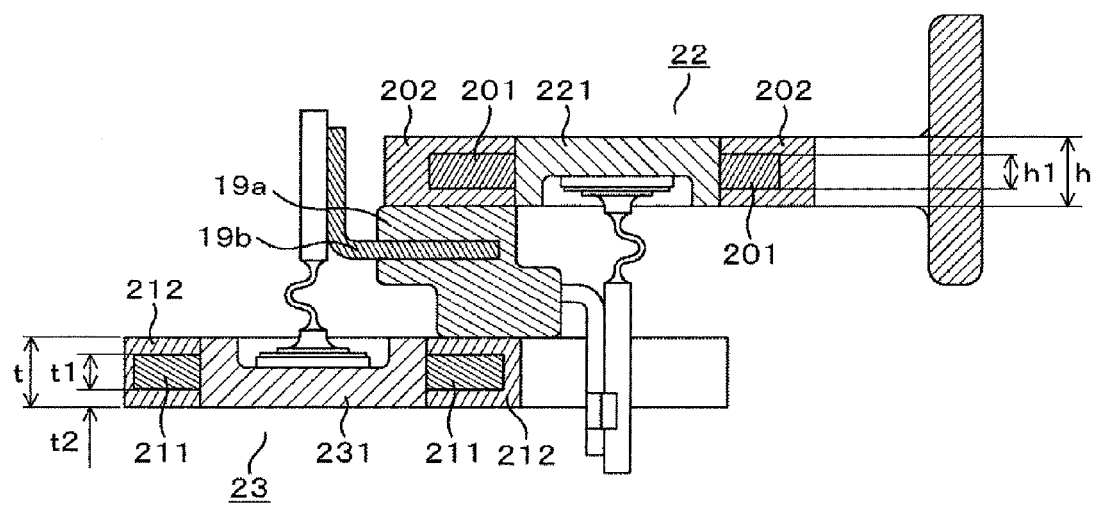
FIG. 26 is a view taken along an F-F section of FIG. 25.

FIG. 23 is a perspective view of a rectifier according to a sixth embodiment of the present invention. FIG. 24 is an exploded view of a rectifier according to the sixth embodiment of the present invention. FIG. 25 is a rear side front view of a rectifier according to the sixth embodiment of the present invention. FIG. 26 is a view taken along an F-F section of FIG. 25.

The first to fifth embodiments have a structure in which a part of the first heat dissipating plate is exposed to the outside air. The first heat dissipating plate is desirably made of a material having a low electric resistance such as copper, although the material has a poor resistance to environment and is easy to rust. Therefore, as a countermeasure for that, plating and coating, etc. will be needed.

The present embodiment can provide an automotive alternator including a low-loss and low-cost rectifier which is fully enclosed, excepting a B-terminal bolt and the press-fit portion with the rectifier elements, by a second heat dissipating plate, thereby providing a high resistance to environment.

The heat dissipating plate 20 of positive pole is made up of a dual structure in which the first heat dissipating plate 201 of positive pole and the second heat dissipating plate 202 of positive pole are made of different materials as shown in FIGS. 23 to 26, and the first heat dissipating plate 201 of positive pole is shaped so as to electrically link the rectifier elements of positive pole with the B-terminal bolt 24, and is provided with a plurality of holes in a horseshoe-shaped plate so that each rectifier element 22 of positive pole and the B-terminal bolt 24 are press-fit thereinto, thereby being electrically connected.

Respective rectifier elements 22 of positive pole are linked with the B-terminal bolt 24 by a first heat dissipating plate of positive pole to constitute wiring for an electric circuit which supplies power to the automobile side.

It is desirable that the base 221 of the rectifier element 22 of positive pole is press-fit into the first heat dissipating plate 201 of positive pole by arranging that the plate thickness h1 of the first heat dissipating plate 201 of positive pole is preferably in a range of 1/4 to 2/3 with respect to the thickness 'h' of the base 221 portion of the rectifier element 22 of positive pole.

The material of the first heat dissipating plate 201 of positive pole preferably has a low electric resistance and a coefficient of linear expansion equivalent to that of the base 221 of the rectifier element. A material having a low electric resistance can reduce heat generation loss caused by a power generation current, making it possible to realize further improvements in efficiency and temperature reduction of the rectifier element 22 of positive pole. The first heat dissipating plate 201 of positive pole is preferably made of copper and is desirably fabricated as a sheet stamping part, which can be manufactured at low cost.

The second heat dissipating plate 202 of positive pole is disposed so as to fully cover the first heat dissipating plate 201 of positive pole, and provided with a large number of heat dissipating fins in the upper and lower faces thereof to improve heat dissipating performance. The second heat dissipating plate 202 of positive pole is preferably made of a material having a high thermal conductivity, and is desirably fabricated by a low-cost and high-productivity process, for example, aluminum die-casting to provide a large number of heat dissipating fins. Integrally forming the second heat dissipating plate 202 of positive pole with the material of the first heat dissipating plate 201 of positive pole by aluminum die-casting will make up a heat dissipating plate 20 of positive pole which is low in cost and excellent in productivity.

The heat dissipating plate 21 of negative pole is made up of a dual structure in which the first heat dissipating plate 211 of negative pole and the second heat dissipating plate 212 of negative pole are made of different materials as shown in FIGS. 23 to 26, and the first heat dissipating plate 211 of negative pole is shaped so as to electrically link a plurality of rectifier elements 23 of negative pole and is provided with a plurality of holes in a horseshoe-shaped plate so that each rectifier element 23 is press-fit thereinto, thereby being electrically connected.

Respective rectifier elements 23 of negative pole are linked by the first heat dissipating plate 211 of negative pole to constitute wiring for an electric circuit which supplies power to the automobile side.

Further, the first heat dissipating plate 211 of negative pole is disposed at a position spaced t2 apart from the rear frame 17 side, with t2 being 0.3 to 1.2 mm, to constitute wiring for an electric circuit which suppresses the electric loss to be minimum and connects to the earth of the automobile side.

The thickness t1 of first heat dissipating plate 211 of negative pole is set to be 1/4 to 2/3 with respect to the thickness 't' of the base 231 portion of the rectifier element 23 of negative pole so that the base 231 of the rectifier element 23 of negative pole is press-fit into the first heat dissipating plate 211 of negative pole.

The material of the first heat dissipating plate 211 of negative pole preferably has a low electric resistance and a coefficient of linear expansion equivalent to that of the base 231 of the rectifier element. A material having a low electric resistance can reduce heat generation loss caused by a power generation current, making it possible to realize further improvements in efficiency and temperature reduction of the rectifier element of negative pole. The first heat dissipating plate 211 of negative pole is preferably made of copper and is desirably fabricated as a sheet stamping part, which can be manufactured at low cost.

The second heat dissipating plate 212 of negative pole is disposed so as to cover the upper face of the first heat dissipating plate 211 of negative pole, and is provided with a large number of heat dissipating fins in the upper and lower faces thereof to improve heat dissipating performance. The second heat dissipating plate 212 of negative pole is preferably made of a material having a high thermal conductivity, and is desirably fabricated by a low-cost and high-productivity process, for example, aluminum die-casting to provide a large number of heat dissipating fins. Integrally forming the second heat dissipating plate 212 of negative pole with the first heat dissipating plate 211 of negative pole by aluminum die-casting will make up a heat dissipating plate 21 of negative pole which is formed of two kinds of materials and is low in cost and excellent in productivity.

Moreover, the first heat dissipating plate of negative pole can achieve the same effects even when it is divided for each rectifier element as in the second embodiment and is put into a simple form of cylindrical shape.

As so far described, according to the present embodiment, by configuring the heat dissipating plate to have a dual structure made up of, depending on purposes, a first heat dissipating plate in which current loss is minimized and a second heat dissipating plate in which heat dissipating performance is enhanced, it is possible to provide an automotive alternator including a high quality rectifier, which can reduce heat generation loss due to a large current at the first heat dissipating plate and improve the heat dissipating performance at the second dissipating plate, thereby promoting the temperature reduction of the rectifier element, and which is suitable for realizing a high output power.

Moreover, by arranging that the material of the first heat dissipating plate has a coefficient of liner expansion equivalent to that of the material of the press-fit portion of the rectifier element, it is possible to provide an automotive alternator including a high quality rectifier without allowing the gap at the press-fit portion to expand due to a temperature change and thereby increasing heat resistance.

Further, by adopting aluminum die-casting, the second heat dissipating plate can be integrally formed as an aluminum die-cast with the first heat dissipating plate, which has a high melting point, being as an insert, and it is possible to provide an automobile alternator including a rectifier having low-cost heat dissipating plates.

Furthermore, it is possible to provide an automotive alternator including a rectifier which has a low-cost heat dissipating plate which has an excellent resistance to environment, such as resistance to salt damage.

While, in the above described each embodiment, description has been made on a method for cooling a rectifier having two sets of stators of 3-phase coil in an automotive alternator, the method can be equally applied to other rectifiers having 5-phase and 6-phase coils, etc.

Though the above described description has been made on embodiments, the present invention will not be limited thereto, and it will be obvious to those skilled in the art that various variations and modifications can be made within the spirit of the present invention and the appended claims thereof.

The invention claimed is:

1. An automotive alternator, comprising:
a stator including a stator coil;
a rotator rotatably supported on an inner peripheral side of the stator via a gap;
a front frame and a rear frame that rotatably support a rotational axis of the rotator and support the stator;
rectifiers that include rectifier elements of positive and negative pole, the rectifiers being fixed at an outer edge portion of the rear frame and electrically connecting the rectifier elements for rectifying alternating power outputted from the stator coil to make up a rectifier circuit;
a protective cover for protecting the rectifiers; and
a cooling fan for sucking cooling air from the protective cover through the rectifiers, wherein
the rectifiers comprises a first metal member electrically connected with the rectifier elements,
a heat dissipating plate integrally formed with the first metal member, and is made up of a second metal member having a heat dissipating fin structure,
the rectifiers are configured such that a heat dissipating plate of positive pole to which the rectifier elements of positive pole are mounted is disposed opposite to a heat dissipating plate of negative pole to which the rectifier elements of negative pole are mounted,
the heat dissipating plate of positive pole is made up of the first metal member and the second metal member,
the first metal member is configured such that the rectifier elements of positive pole are electrically connected with an output terminal,
the second metal member is provided with a plurality of holes having a shape that is complimentary to a shape of the rectifier elements of positive pole and the output terminal, the second metal member is disposed so as to cover the first metal member so that the rectifier elements of positive pole and the output terminal are placed in the plurality of holes, the second metal member is provided with a plurality of cooling fins in upper and lower faces thereof, the heat dissipating plate of negative pole is made up of the first metal member and the second metal member, the first metal member is configured such that the rectifier elements of negative pole are electrically connected, the second metal member is provided with another plurality of holes having a shape that is complimentary to shape of the rectifier elements of negative pole, the second metal member is disposed so as to cover the first metal member so that the rectifier elements of negative pole is placed in the another plurality of holes, and the first metal member of the heat dissipating plate of negative pole is disposed in contact with a rear frame side.

2. The automotive alternator according to claim 1, wherein the first metal member of the heat dissipating plate of the rectifiers has a thermal conductivity higher than that of the second metal member.

3. The automotive alternator according to claim 1, wherein the first metal member of the heat dissipating plate of the rectifiers has an electric resistance lower than that of the second metal member.

4. The automotive alternator according to claim 3, wherein the first metal member is essentially composed of copper, and the second metal member is essentially composed of aluminum.

5. The automotive alternator according to claim 1, wherein the first metal member of the heat dissipating plate of the rectifiers has an electric resistance lower than that of the second metal member, and a thermal conductivity lower than that of the second metal member.

6. The automotive alternator according to claim 1, wherein the first metal member of the heat dissipating plate of negative pole is divided into a plurality of parts in accordance with the number of rectifier elements.

7. The automotive alternator according to claim 6, wherein the rectifiers have the first metal member of the heat dissipating plate of negative pole formed into a cylindrical shape.

8. The automotive alternator according to claim 1, wherein the rectifiers are configured such that a base portion with a respective rectifier element is entirely press-fit into the first metal member.

9. The automotive alternator according to claim 1, wherein the positions of the rectifier elements and the first metal member are arranged such that the first metal member is disposed at a position of a base of the rectifier element on an opposite side of a lead of the rectifier elements.

10. The automotive alternator according to claim 1, wherein the the rectifiers are made up of the heat dissipating plate in which the first metal member of the heat dissipating plate is fully enclosed by the second metal member.

11. The automotive alternator according to claim 1, wherein the rectifiers have the first metal member made of a material which has a predetermined electric resistance, and a coefficient of linear expansion equivalent to that of a base of the rectifier element.

12. The automotive alternator according to claim 1, wherein the second metal member is made by aluminum die-casting, and is integrated with the first metal member at a same time.

* * * * *